(12) United States Patent
Raffle et al.

(10) Patent No.: US 9,285,872 B1
(45) Date of Patent: Mar. 15, 2016

(54) USING HEAD GESTURE AND EYE POSITION TO WAKE A HEAD MOUNTED DEVICE

(71) Applicant: Google Inc., Mountain View, CA (US)

(72) Inventors: Hayes Solos Raffle, Palo Alto, CA (US); Chun Yat Frank Li, Moutain View, CA (US)

(73) Assignee: Google Inc., Mountain View, CA (US)

( * ) Notice: Subject to any disclaimer, the term of this patent is extended or adjusted under 35 U.S.C. 154(b) by 60 days.

(21) Appl. No.: 14/103,980

(22) Filed: Dec. 12, 2013

(51) Int. Cl.
*G09G 5/00* (2006.01)
*G06F 3/01* (2006.01)
*G02B 27/01* (2006.01)

(52) U.S. Cl.
CPC .............. *G06F 3/012* (2013.01); *G02B 27/017* (2013.01); *G06F 3/013* (2013.01)

(58) Field of Classification Search
CPC ......... G06F 3/011; G06F 3/013; G06F 3/012; G06F 1/163; G06F 3/017; G02B 27/017
See application file for complete search history.

(56) References Cited

U.S. PATENT DOCUMENTS

| | | | |
|---|---|---|---|
| 6,396,497 B1 | 5/2002 | Reichlen | |
| 8,235,529 B1 * | 8/2012 | Raffle et al. | 351/209 |
| 8,488,246 B2 | 7/2013 | Border et al. | |
| 2009/0195749 A1 | 8/2009 | Blum et al. | |
| 2012/0242560 A1 * | 9/2012 | Nakada et al. | 345/8 |
| 2013/0214998 A1 | 8/2013 | Andes et al. | |
| 2013/0278631 A1 | 10/2013 | Border et al. | |
| 2014/0009739 A1 * | 1/2014 | Greco et al. | 351/206 |
| 2014/0092268 A1 * | 4/2014 | Cleveland | 348/211.4 |
| 2014/0372944 A1 * | 12/2014 | Mulcahy et al. | 715/810 |
| 2014/0380230 A1 * | 12/2014 | Venable et al. | 715/781 |

* cited by examiner

*Primary Examiner* — Lixi C Simpson
(74) *Attorney, Agent, or Firm* — McDonnell Boehnen Hulbert & Berghoff LLP

(57) ABSTRACT

Embodiments described herein may help to provide a wake-up mechanism for a computing device. An example method involves, the computing device: (a) receiving head-movement data that is indicative of head movement; (b) detecting at least a portion of the head-movement data that is indicative of a head gesture; (c) receiving eye-position data that is indicative of eye position; (d) detecting at least a portion of the eye-position data that is indicative of an eye being directed towards a display of a head-mounted device (HMD); and (e) causing the HMD to switch from a first operating mode to a second operating mode in response to the detection of both: (i) the eye-movement data that is indicative of an eye directed towards the display, and (ii) the head-movement data indicative of the head gesture.

20 Claims, 13 Drawing Sheets

USING HEAD GESTURE AND EYE POSITION TO WAKE A HEAD MOUNTED DEVICE

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Wearable computing devices with near-eye displays may also be referred to as "head-mountable displays" (HMDs), "head-mounted displays," "head-mounted devices," or "head-mountable devices." A head-mountable display places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display or a larger form such as a helmet, for example.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming. Many other applications are also possible.

SUMMARY

Example embodiments help to provide interfaces for waking a computing device, and in particular, for waking a head-mountable device (HMD). In particular, example embodiments may allow a user to wake an HMD or another type of computing device using the combination of a head gesture (e.g., tilting their head at a particular angle) and directing an eye towards the HMD's display.

In one aspect, a method involves, a head-mounted device: (a) receiving head-movement data that is indicative of head movement; (b) detecting at least a portion of the head-movement data that is indicative of a head gesture; (c) receiving eye-position data that is indicative of eye position; (d) detecting at least a portion of the eye-position data that is indicative of an eye being directed towards a display of a head-mounted device (HMD); and (e) causing the HMD to switch from a first operating mode to a second operating mode in response to the detection of both: (i) the eye-movement data that is indicative of an eye directed towards the display, and (ii) the head-movement data indicative of the head gesture.

In a further aspect, a non-transitory computer readable medium having stored therein instructions executable by a computing device to cause the computing device to perform functions comprising: (a) receiving head-movement data that is indicative of head movement; (b) detecting at least a portion of the head-movement data that is indicative of a head gesture; (c) receiving eye-position data that is indicative of eye position; (d) detecting at least a portion of the eye-position data that is indicative of an eye being directed towards a display of a head-mounted device (HMD); and (e) causing the HMD to switch from a first operating mode to a second operating mode in response to the detection of both: (i) the eye-movement data that is indicative of an eye directed towards the display, and (ii) the head-movement data indicative of the head gesture.

In another aspect, a computing device comprises a display; a non-transitory computer readable medium; and program instructions stored on the non-transitory computer readable medium and executable by at least one processor to: (a) receive head-movement data that is indicative of head movement; (b) detect at least a portion of the head-movement data that is indicative of a head gesture; (c) receive eye-position data that is indicative of eye position; (d) detect at least a portion of the eye-position data that is indicative of an eye being directed towards a display of a head-mounted device (HMD); and (e) cause the HMD to switch from a first operating mode to a second operating mode in response to the detection of both: (i) the eye-movement data that is indicative of an eye directed towards the display, and (ii) the head-movement data indicative of the head gesture.

In a further aspect, a computing device may include means for (a) receiving head-movement data that is indicative of head movement; (b) detecting at least a portion of the head-movement data that is indicative of a head gesture; (c) receiving eye-position data that is indicative of eye position; (d) detecting at least a portion of the eye-position data that is indicative of an eye being directed towards a display of a head-mounted device (HMD); and (e) causing the HMD to switch from a first operating mode to a second operating mode in response to the detection of both: (i) the eye-movement data that is indicative of an eye directed towards the display, and (ii) the head-movement data indicative of the head gesture.

These as well as other aspects, advantages, and alternatives will become apparent to those of ordinary skill in the art by reading the following detailed description, with reference where appropriate to the accompanying drawings.

DETAILED DESCRIPTION

Figure 1A:
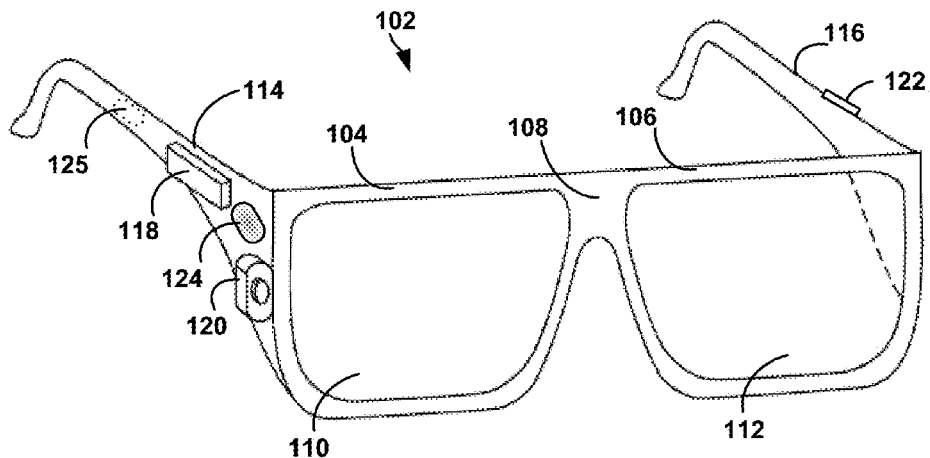
FIG. 1A to 1G show a wearer unlocking a head-mountable device, according to an example embodiment.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Example embodiments may provide interfaces that help to wake a computing device, such as a head-mountable device (HMD) or a mobile phone. In an example embodiment, a wake-up sequence for an HMD may include two modalities of input. In particular, a wake-up sequence for an HMD may include an eye being directed towards the HMD and a head gesture. This combination of inputs is intended to reflect a user's natural actions when the user attempts to use the HMD.

More specifically, an HMD may be configured to operate in a standby mode, where some or all functionality is limited. While in the standby mode, the HMD may receive and analyze sensor data that is indicative of eye position and/or head movement. As such, to enter the wake-up sequence, the wearer of the HMD can direct an eye towards the display and then perform a head gesture. Upon detecting both of these conditions, the HMD responsively wakes up.

When an HMD's display is arranged forward of and above the eye, it has been observed that users tend to tilt their head upwards at a slight angle (such as 5–10°) in order to look at the display. In an example embodiment, the HMD may detect when a user tilts their head as such and, at the same time, is directing their eye towards the display, and responsively wake-up from a standby mode. Such a response to this simple combination is intended to create a natural interaction with the HMD.

However, not all HMDs are alike, and therefore it is contemplated that an HMD may wake in response to other combinations of head-movement and eye-position data. For example, a display of an HMD may be located forward and to the right of a user's eye. In such circumstances, it may be desirable for the head gesture to be a right head turn towards the display. Similarly, not all users are alike, and therefore, in some embodiments, a user may configure the HMD to detect a preferred head gesture that may or may not be towards the display. To this end, an HMD may also provide a calibration technique in which the user is prompted to align their eye with the display, to learn the user's individual head-movements and/or eye positioning to look at the HMD's display.

Data that indicates the position of an HMD user's eye may be generated by various types of sensors, such as by an inward-facing camera. In some implementations, an inward-facing camera may be integrated in a light guide that is also part of the HMD's display. In such an embodiment, when the user looks at the display, the light guide may direct light from the user's eye onto the camera. The camera may accordingly take one or more images of the eye, and analyze the images to determine whether the eye is directed towards the display.

In a further aspect, data that indicates the position of an HMD user's eye may be generated by a combination of (a) an inward-facing camera or one or more photosensors and (b) one or more light sources. The light sources create reflections off the eye that are known as glints. Sensor data from the camera or photosensors may then be analyzed to detect the glints on the eye and determine the position of the eye therefrom.

It should be understood that the above-described examples are provided for illustrative purposes, and are not intended to be limiting. Variations on the above examples and/or other examples are also possible.

II. Example Wearable Computing Devices

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable device (HMD).

An example system may also be implemented in or take the form of other devices, such as a mobile phone, among other possibilities. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

FIG. 1A illustrates a wearable computing system according to an example embodiment. In FIG. 1A, the wearable computing system takes the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touch pad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire-or wirelessly-connected to the HMD 102). The on-board computing system 118 may include a processor and memory, for example. The on-board computing system 118 may be configured to receive and analyze data from the image capture device 120 and the finger-operable touch pad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 102 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touch pad 124 is shown on the extending side-arm 114 of the HMD 102. However, the finger-operable touch pad 124 may be positioned on other parts of the HMD 102. Also, more than one finger-operable touch pad may be present on the HMD 102. The finger-operable touch pad 124 may be used by a user to input commands. The finger-operable touch pad 124 may sense at least one of a pressure, position and/or a movement of one or more fingers via capacitive sensing, resistance sensing, or a surface acoustic wave process, among other possibilities. The finger-operable touch pad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

In a further aspect, HMD 102 may be configured to receive user input in various ways, in addition or in the alternative to user input received via finger-operable touch pad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) sense a user's eye movements and/or positioning. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
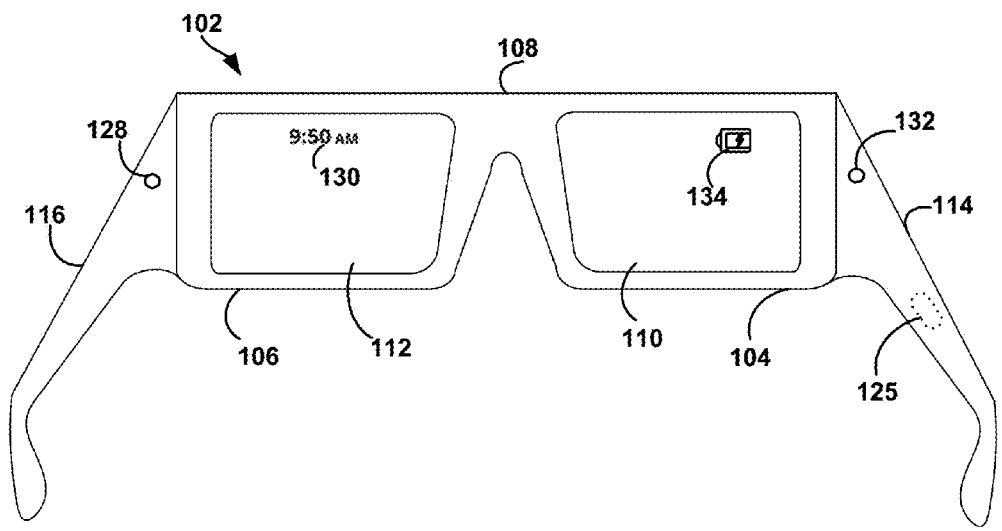

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
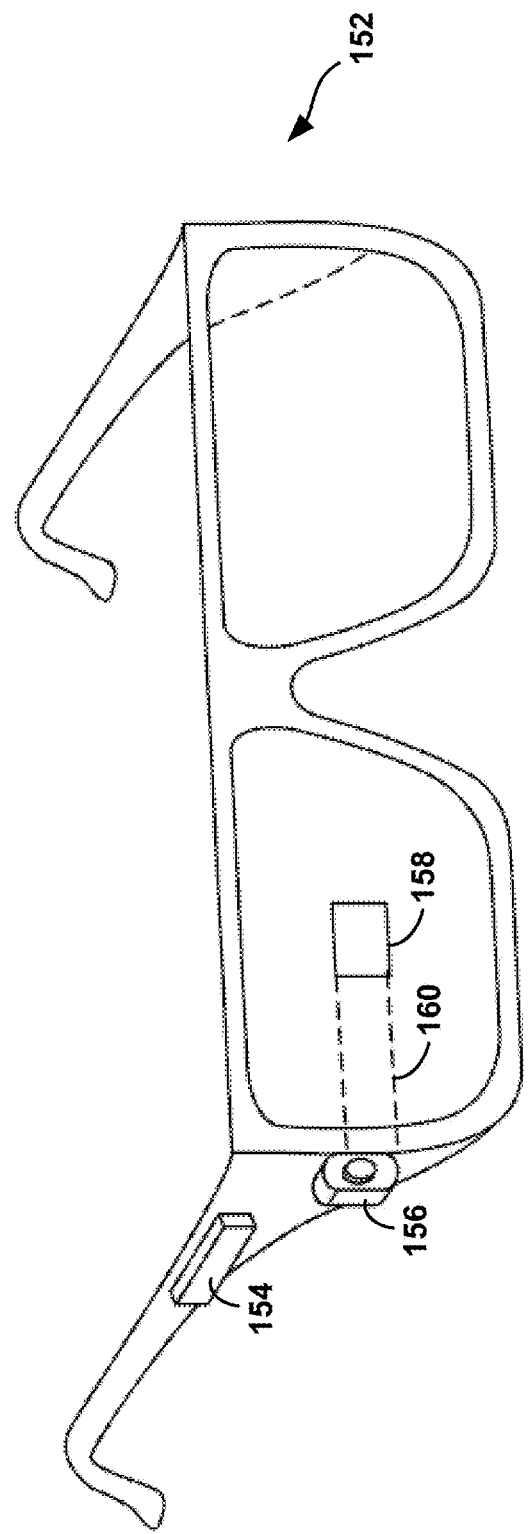

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
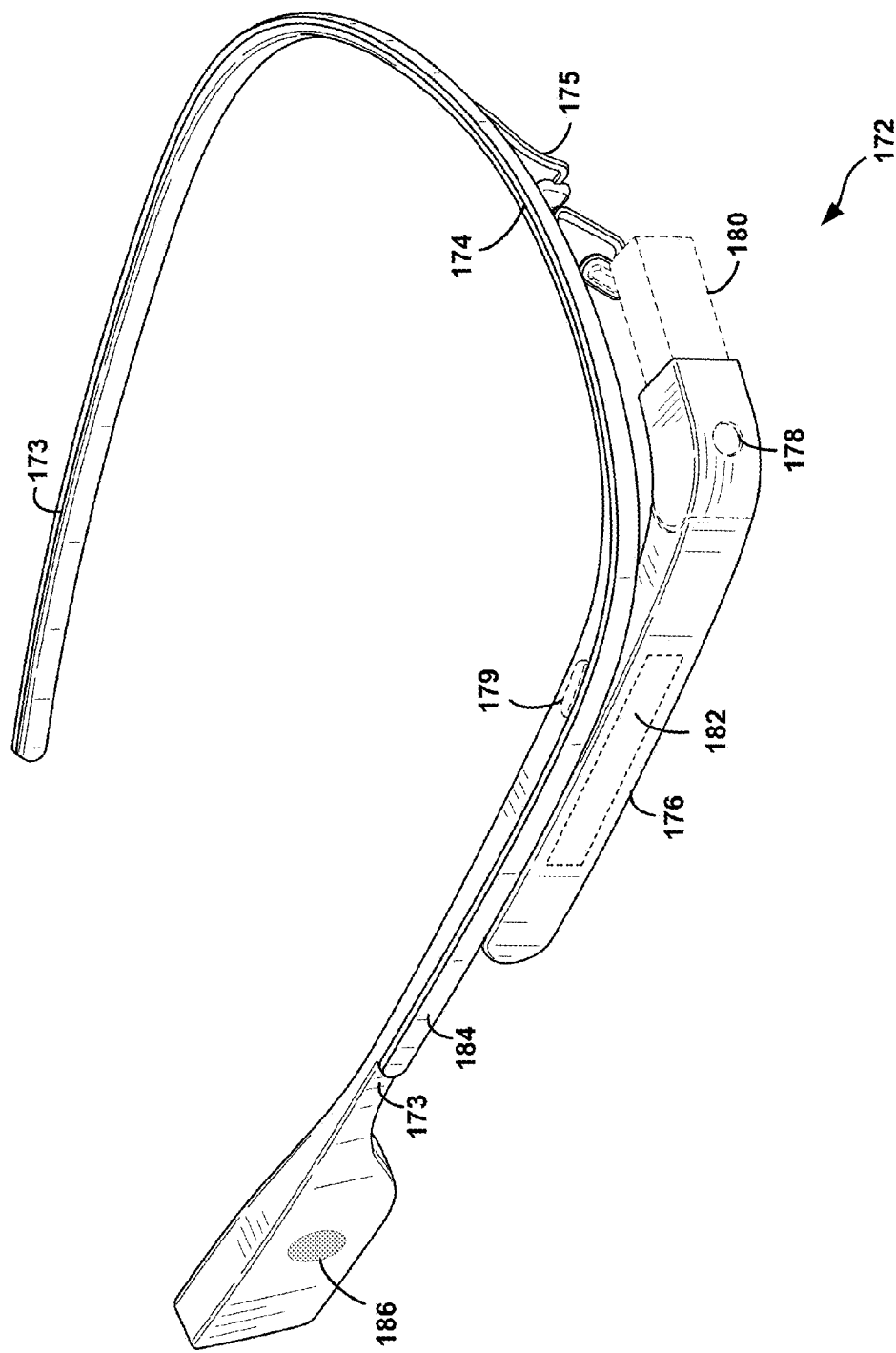

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 186.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

Figure 1E:
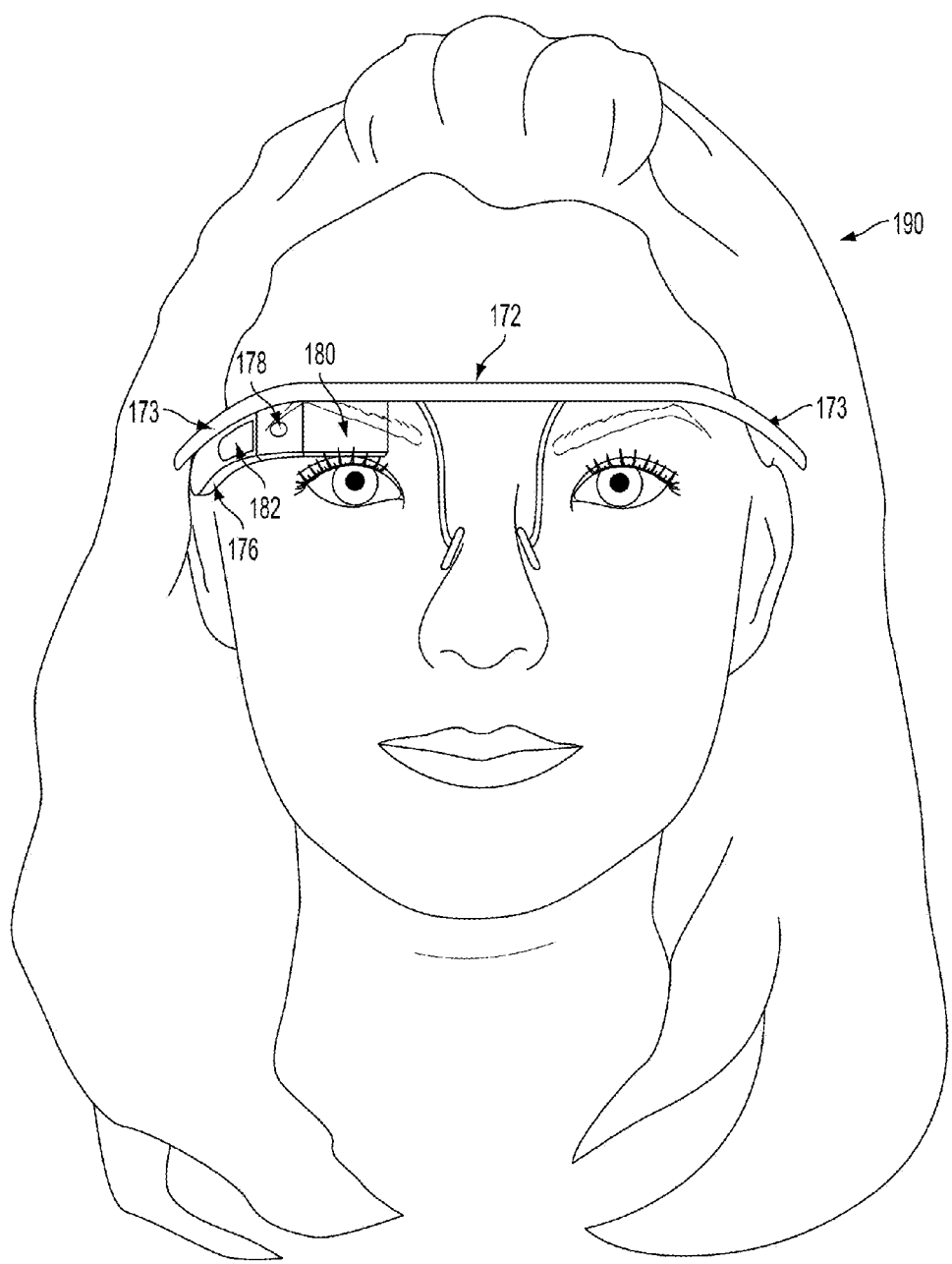
Figure 1F:
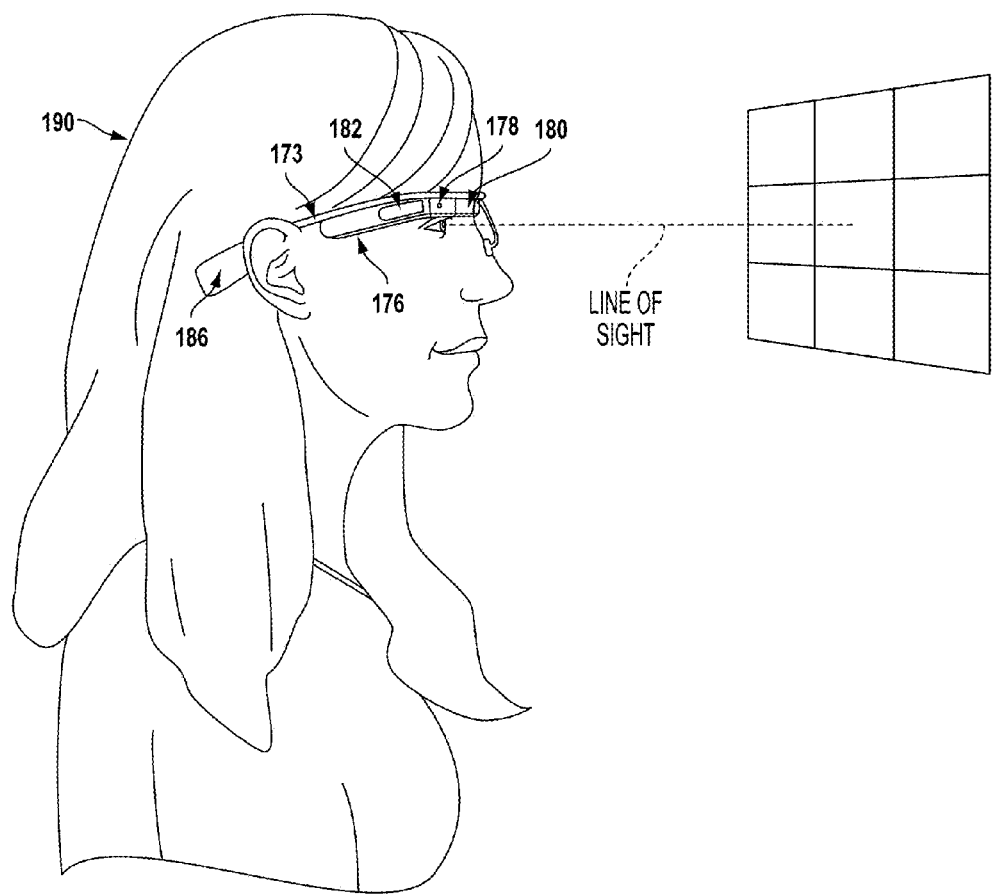
Figure 1G:
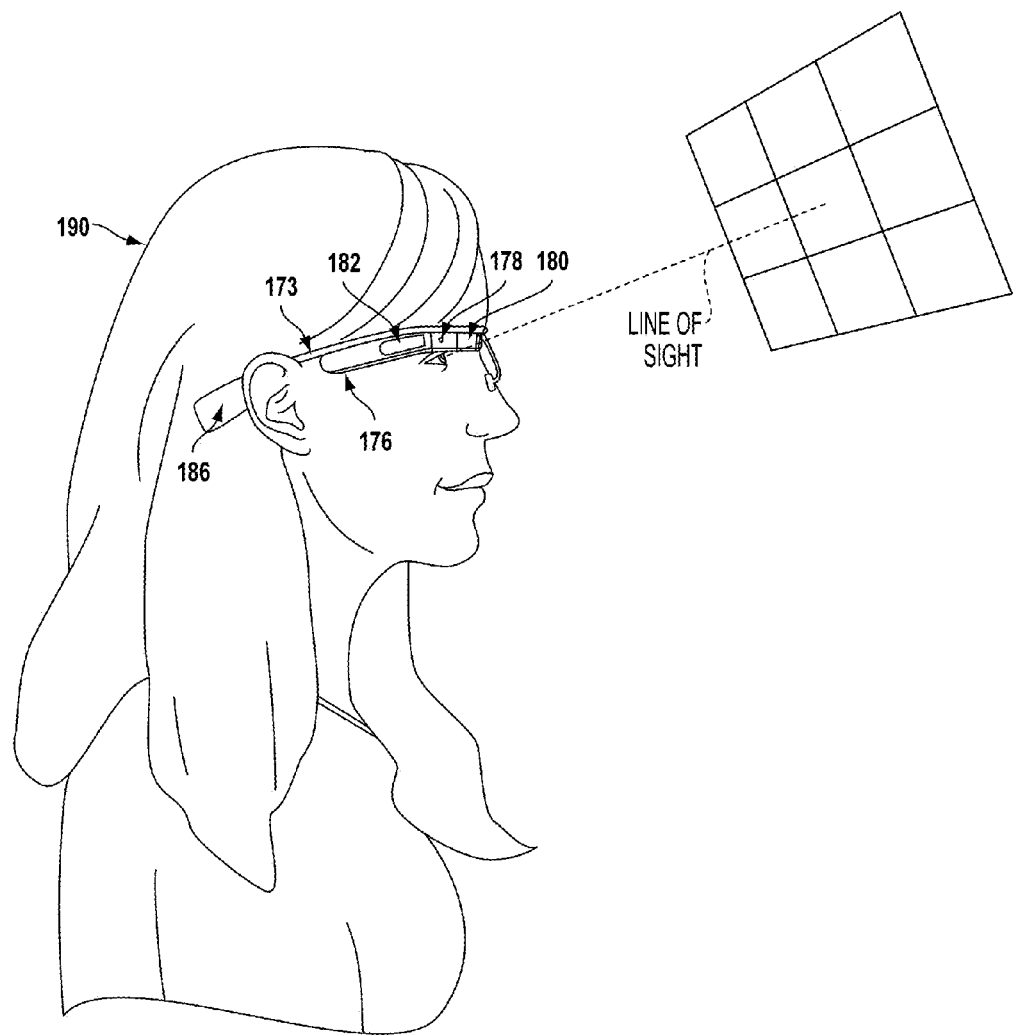

FIGS. 1E to 1G are simplified illustrations of the HMD 172 shown in FIG. 1D, being worn by a wearer 190. As shown in FIG. 1F, when HMD 172 is worn, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with their eyes only (possibly without moving their head). This is illustrated as shown in FIG. 1G, where the wearer has moved their eyes to look up and align their line of sight with display 180. A wearer might also use the display by tilting their head down and aligning their eye with the display 180.

Figure 2:
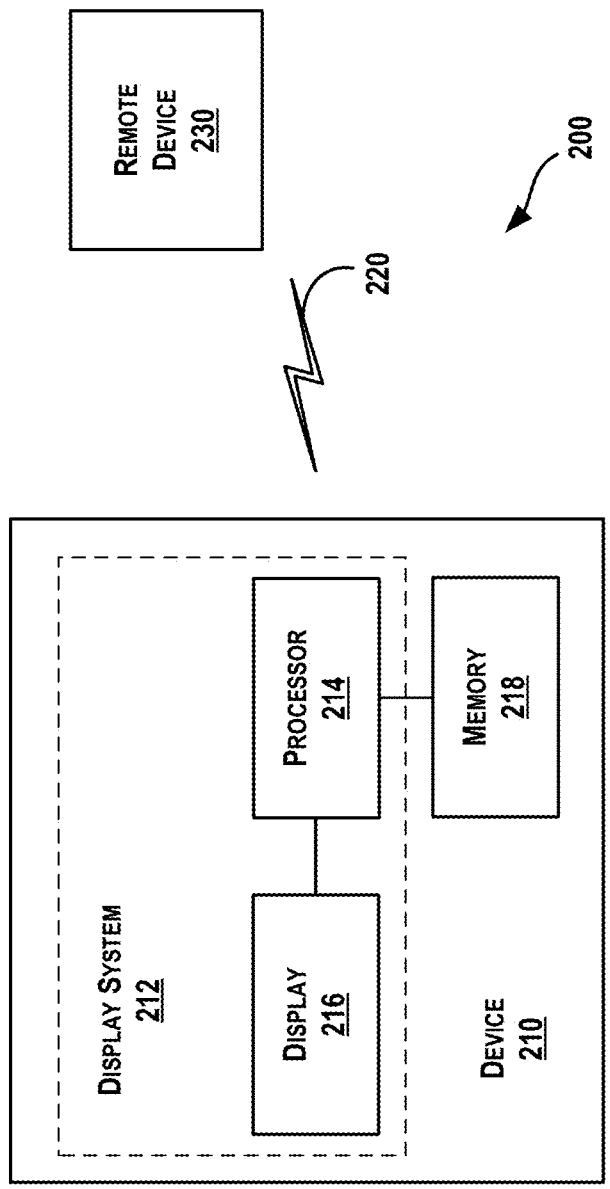
FIG. 2 illustrates a wearable computing system according to an example embodiment.

FIG. 2A is a simplified block diagram a computing device 210 according to an example embodiment. In an example embodiment, device 210 communicates using a communication link 220 (e.g., a wired or wireless connection) to a remote device 230. The device 210 may be any type of device that can receive data and display information corresponding to or associated with the data. For example, the device 210 may take the form of or include a head-mountable display, such as the head-mounted devices 102, 152, or 172 that are described with reference to FIGS. 1A to 1G.

The device 210 may include a processor 214 and a display 216. The display 216 may be, for example, an optical see-through display, an optical see-around display, or a video see-through display. The processor 214 may receive data from the remote device 230, and configure the data for display on the display 216. The processor 214 may be any type of processor, such as a micro-processor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, head-mountable display, tablet computing device, etc., that is configured to transmit data to the device 210. The remote device 230 and the device 210 may contain hardware to enable the communication link 220, such as processors, transmitters, receivers, antennas, etc.

Further, remote device 230 may take the form of or be implemented in a computing system that is in communication with and configured to perform functions on behalf of client device, such as computing device 210. Such a remote device 230 may receive data from another computing device 210 (e.g., an HMD 102, 152, or 172 or a mobile phone), perform certain processing functions on behalf of the device 210, and then send the resulting data back to device 210. This functionality may be referred to as "cloud" computing.

In FIG. 2A, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

Figure 5:
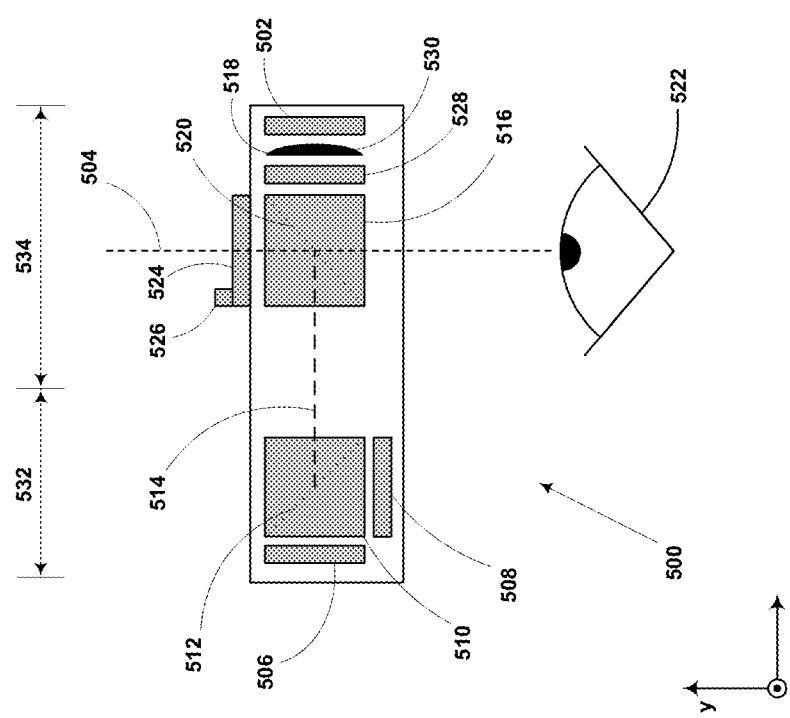
FIG. 5 shows an illustrative optical system with infrared source, camera and image, according to an example embodiment.

III. Illustrative Optical System with Infrared Source, Camera and Image Former FIG. 5 illustrates a top view of an optical system 500 that is configured to display a virtual image superimposed upon a real-world scene viewable along a viewing axis 504. For clarity, a distal portion 532 and a proximal portion 534 represent optically-coupled portions of the optical system 500 that may or may not be physically separated. An example embodiment includes a display panel 506 that may be illuminated by a light source 508. Light emitted from the light source 508 is incident upon the distal beam splitter 510. The light source 508 may include one or more light-emitting diodes (LEDs) and/or laser diodes. The light source 508 may further include a linear polarizer that acts to pass one particular polarization to the rest of the optical system.

In an example embodiment, the distal beam splitter 510 is a polarizing beam splitter that reflects light depending upon the polarization of light incident upon the beam splitter. To illustrate, s-polarized light from the light source 508 may be preferentially reflected by a distal beam-splitting interface 512 towards the display panel 506. The display panel 506 in the example embodiment is a liquid crystal-on-silicon (LCOS) display, but could also be a digital light projector (DLP) micro-mirror display, or other type of reflective display panel. The display panel 506 acts to spatially-modulate the incident light to generate a light pattern. Alternatively, the display panel 506 may be an emissive-type display such as an organic light-emitting diode (OLED) display or a transmissive liquid crystal display (LCD) with a backlight; in such cases, distal beam splitter 510 and light source 508 may be omitted.

In the example in which the display panel 506 is a LCOS display panel, the display panel 506 generates a light pattern with a polarization perpendicular to the polarization of light initially incident upon the panel. In this example embodiment, the display panel 506 converts incident s-polarized light into a light pattern with p-polarization. The generated light pattern from the display panel 506 is directed towards the distal beam splitter 510. The p-polarized light pattern passes through the distal beam splitter 510 and is directed along an optical axis 514 towards the proximal region of the optical system 500. In an example embodiment, the proximal beam splitter 516 is also a polarizing beam splitter. The light pattern is at least partially transmitted through the proximal beam splitter 516 to the image former 518. In an example embodiment, image former 518 includes a concave mirror 530 and a proximal quarter-wave plate 528. The light pattern passes through the proximal quarter-wave plate 528 and is reflected by the concave mirror 530.

The reflected light pattern passes back through proximal quarter-wave plate 528. Through the interactions with the proximal quarter-wave plate 528 and the concave mirror 530, the light patterns are converted to the s-polarization and are formed into a viewable image. This viewable image is incident upon the proximal beam splitter 516 and the viewable image is reflected from proximal beam splitting interface 520 towards a viewing location 522 along a viewing axis 504. A real-world scene is viewable through a viewing window 524. The viewing window 524 may include a linear polarizer in order to reduce stray light within the optical system. Light from the viewing window 524 is at least partially transmitted through the proximal beam splitter 516. Thus, both a virtual image and a real-world image are viewable to the viewing location 522 through the proximal beam splitter 516.

Although FIG. 5 depicts the distal portion 532 of the optical system housing as to the left of the proximal portion 534 of the optical system housing when viewed from above, it is understood that other embodiments are possible to physically realize the optical system 500, including the distal portion 532 being configured to be to the right, below and above with respect to the proximal portion 534. Further, although an example embodiment describes an image former 518 as comprising a concave mirror 530, it is understood by those skilled in the art that the image former 518 may comprise a different optical element, such as an optical lens or a diffractive optic element.

In one embodiment, the proximal beam splitter 516, the distal beam splitter 510, and other components of optical system 500 are made of glass. Alternatively, some or all of such optical components may be partially or entirely plastic, which can also function to reduce the weight of optical system 500. A suitable plastic material is Zeonex® E48R cyclo olefin optical grade polymer which is available from Zeon Chemicals L.P., Louisville, Ky. Another suitable plastic material is polymethyl methacrylate (PMMA).

An example embodiment may include an infrared light source 526 that is configured to illuminate the viewing location 522. Although FIG. 5 depicts the infrared light source 526 as adjacent to viewing window 524, those skilled in the art will understand that the infrared light source 526 could be located elsewhere, such as on the side of the proximal beam splitter 516 that is adjacent to the viewing location 522 or in the distal portion 532 of the optical system 500. The infrared light source 526 may represent, for example, one or more infrared light-emitting diodes (LEDs). Infrared LEDs with a small size may be implemented, such as the Vishay Technology TSML 1000 product.

Further, those skilled in the art will understand that, for best accuracy in sensing a position of an eye, it may be advantageous to obtain infrared images of the eye pupil using light sources that illuminate the eye from positions off-axis and/or on-axis with respect to the viewing axis 504. Therefore, the infrared light source 526 may include one or more LEDs located at different locations in the optical system 500.

Infrared light generated from the infrared light source 526 is configured to be incident upon the viewing location 522. Thus, the wearer's eye pupil may be illuminated with the infrared light. The infrared light may be reflected from the wearer's eye back along the viewing axis 504 towards the proximal beam splitter 516. A portion of the reflected infrared light may be reflected from the beam splitting interface 520 towards the image former 518.

In order to transmit infrared light to an infrared camera 502, the image former 518 may include a dichroic thin film configured to selectively reflect or transmit incident light depending upon the wavelength of the incident light. For instance, the dichroic thin film may be configured to pass infrared light while reflecting visible light. In an example embodiment, the visible light pattern generated by the display panel 506 may be reflected by the concave mirror 530 and the visible light pattern may be formed into a viewable image. The infrared light may thus be preferably transmitted through the concave mirror 530 to infrared camera 502. Dichroic thin film coatings are available commercially from companies such as JML Optical Industries and Precision Glass & Optics (PG&O) and comprise multiple layers of dielectric and/or metal films. These dichroic coatings are also called 'cold mirrors'.

In an example embodiment, a small aperture or apertures may be introduced into the image former 518, which may be realized by one or more pinholes (e.g., a central pinhole) in the concave mirror 530. In this example embodiment, most of the visible and infrared light is reflected off of and formed by the image former 518 into an image viewable by the HMD wearer. Some of the visible and infrared light passes through the aperture and is incident upon the infrared camera 502. The infrared camera 502 may selectively filter and detect the infrared light from the combination of visible and infrared light to obtain information regarding the wearer's eye pupil location. Alternatively, the infrared light source 526 may be modulated to provide a frequency reference for a lock-in amplifier or phase-locked loop in order that the infrared light signal is obtained efficiently. Also, the visible light source 508 may be modulated and infrared light detection could be performed when the visible light source 508 is off, for example. Those with skill in the art will understand that there are other variations of transducing an infrared light signal mixed with a visible light signal with an infrared camera and that those variations are included implicitly in this specification.

IV. Illustrative Glint Detection and Eye-Position Sensing System

Figure 8:
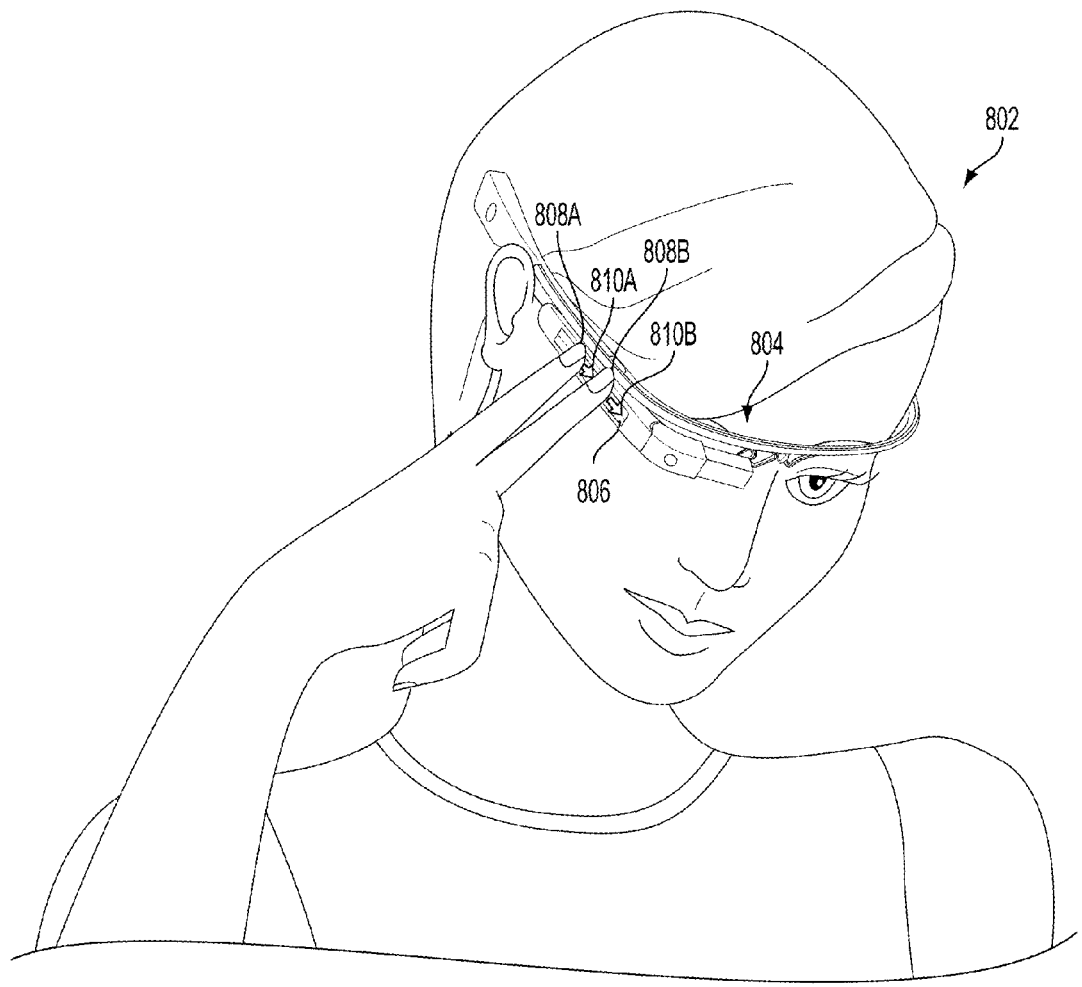
FIG. 8 shows an wearable computing system with a touchpad, according to an example embodiment.

FIG. 8 is a simplified illustration of an eye-position sensing system 600, according to an illustrative embodiment. The system may include software, hardware and/or firmware. As shown, system 600 includes a glint detection module (GDM) 620, a pupil detection module (PDM) 630, a feature normalization module 640, a calibration module 650, and a gaze estimation module 660. Further, GDM 620 and PDM 630 are configured to receive IR image data 610.

The IR image data 610 may take various forms. For example, IR image data 610 may be video captured by a single, or possibly multiple IR cameras. Further, the IR camera may be configured, and/or the IR image data may be processed, such that the video includes a sequence of gray scale images of an eye. Other types of IR image data are also possible.

Further, a number of IR light sources (e.g., four IR LEDS) may be attached to an HMD or otherwise arranged so as to direct light towards the eye and create glints on the retina. Glint detection module 620 may be configured to analyze the IR image data 610 and detect the glints, which may then be utilized to normalize pupil location as determined by pupil detection module 630.

Glint detection module 620 may use various techniques to determine and/or track the location of glints. For example, glint detection module 620 may utilize a motion-detection-based technique to detect and track glints in IR image data 610, such as the technique that is described in greater detail below in section VI(A).

The pupil detection module 630 may use various techniques to determine and/or track the location of the pupil; and in particular, to determine the location of the center of the pupil. For example, pupil detection module 630 may utilize a computer-vision algorithm to estimate the coordinates of the pupil center. Further, in some embodiments, the determined coordinates may be adjusted based on a balloon-blowing algorithm. This process is described in greater detail below in section VI(B). However, it should be understood that other pupil-detection techniques and/or other techniques for locating the center of the pupil are also possible.

Feature normalization module 640 may use various techniques to normalize pupil location based on detected glints. For example, as described in greater detail in section VI(C), feature normalization module 640 may determine a normalized feature vector for each frame of IR image data by using the glint locations for the frame, as determined by glint detection module 620, to normalize the pupil-center location, as determined by pupil detection module 630. This may help to eliminate or reduce the amount of calibration required by system 600 and/or may help to improve the ability of system 600 to provide accurate eye-position sensing when drift of the head occurs.

Calibration module 650 may use various techniques to calibrate data associated with one or more inputs. For example, calibration module 650 may receive an expected gaze location and a normalized pupil location as inputs. The calibration module 650 may use the inputs to train one or more regressors using different combinatoric sub-sets of the glints for normalization. The result of the calibration may include an ensemble of polynomial regressors, which may be used to more effectively determine an estimated gaze location.

Gaze estimation module 660 may use various techniques to determine an estimated gaze location. For example, as described in greater detail in section VI(E), gaze estimation module 660 may receive one or more of the polynomial regressors from the calibration module 650. The gaze estimation module 660 may combine the regressors to estimate a gaze location for one or more frames. As an example, the gaze estimation module 660 may combine multiple regressors to determine a median gaze location over a predetermined number of frames. In a further aspect, the estimated gaze location may be presented to the user to verify the gaze estimation quality after calibration.

A. Glint Detection

In an example embodiment, glint detection module 620 may analyze IR image data 610 to output the locations of glints in the image data. In particular, the glint detection module 620 may output one or more estimates of the image coordinates for each glint. Each estimate may also be referred to as a "glint hypothesis," while a set of one or more estimates for a given glint may be referred to as the "glint hypothesis set" for the given glint.

The GDM 620 may receive infrared IR image data 610 of an eye. The IR image data may be, for example, video or a sequence of still images of the eye. Further, three or more IR light sources are arranged to direct light towards the eye, and the IR image data may capture the glint or glints that result from when the IR light sources are switched on. More specifically, the IR image data may be recorded while three or more IR light sources are being switched on and off according to a predetermined pattern in which one of the IR light sources is switched off during the recording of any given frame of the IR image data.

The GDM 620 may subtract a first frame of the IR image data from a second frame of the IR image data to determine a first frame difference. The GDM 620 may then analyze the first frame difference to determine at least one location for a first glint corresponding to a first one of the IR light sources, which was off during the first frame (and is on during the second frame).

Further configuration of GDM 620 will now be described by way of example with reference to an implementation in which four glints can be created by four IR light sources, and in the IR light sources are arranged such that the four glints form a rectangular glint pattern. However, it should be understood that embodiments may be implemented with more or less glints and/or with differently-shaped glint patterns.

Figure 7A:
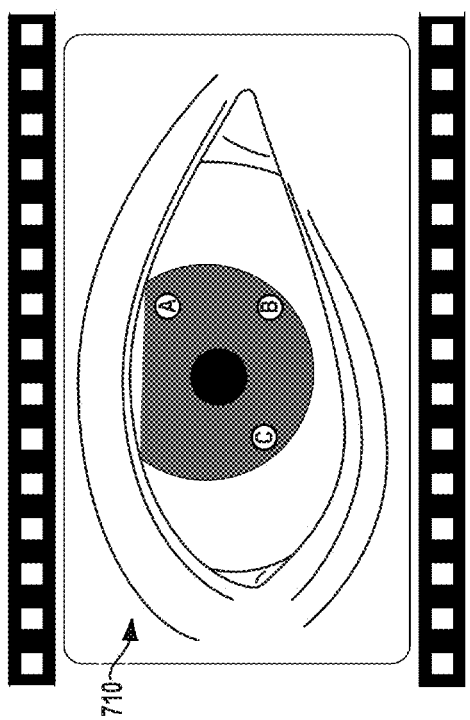
FIGS. 7A to 7D show illustrative images of eye glints, according to an example embodiment.
Figure 7B:
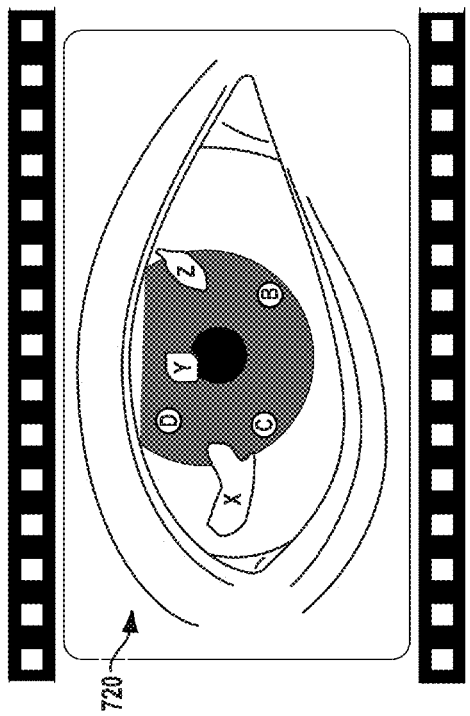

FIGS. 7A and 7B illustrate a first frame and a second frame of IR image data, respectively, according to an illustrative scenario. In particular, FIG. 7A shows a first frame 710 from a sequence of IR images of the eye, and FIG. 7B shows a second frame 720 from the sequence. In the illustrated scenario, one IR light source is switched off for each frame, with the particular IR light source that is switched off being rotated in a clockwise direction. As such, the first frame 710 captures glints A, B, and C. In the second frame 720, the switched off light source is rotated such glint D appears, while glint A disappears and thus is not captured. As such, the second frame 720 captures glints B, C, and D.

Note that the second frame 720 also includes glints X, Y, and Z, which do not correspond to any of the IR light sources.

Other glints, such as glints X, Y, and Z may result from other light sources in the environment (e.g., the sun, a desk lamp, a computer monitor, etc.).

GDM 620 may receive the first frame 710 and the second frame 720, and determine a frame difference between the two frames. In an example embodiment, GDM 620 may further apply a binary threshold process to filter the frame difference. By doing so, the GDM may substantially remove disappearing glints the frame difference. Note that herein disappearing glints should be understood to be glints that appear in the one frame and are not in a subsequent frame (due to the corresponding light source being switched on and off).

i. Hypothesis Set for an Appearing Glint

Figure 7C:
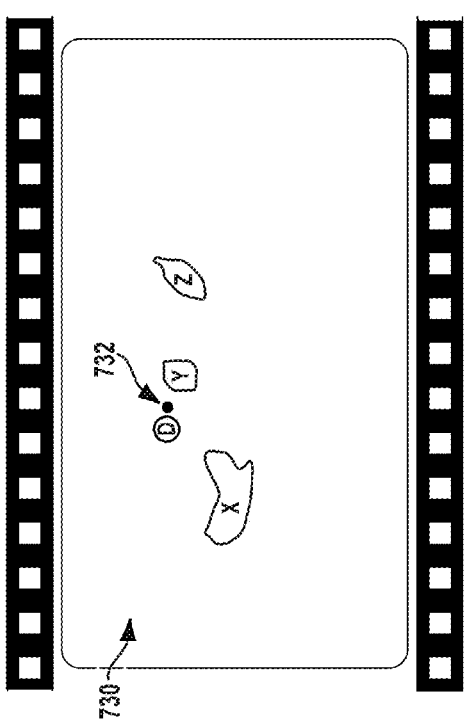

FIG. 7C is a simplified illustration of a frame difference 730, according to an illustrative embodiment. In particular, frame difference 730 may be a thresholded frame difference that is determined by subtracting the first frame 710 from the second frame 720, and applying binary thresholding to the resulting frame difference. Thus, as shown, thresholded frame difference 730 includes glint D, which is the appearing glint in the second frame 720.

In the illustrated scenario, thresholded frame difference 730 also includes glints X, Y, and Z, which result from, e.g., ambient light sources. Glints that do not correspond to an IR light source (e.g., that are not controlled), such as glints X, Y, and Z, may be referred to as "ambient glints." In some instances, ambient glints may interfere with the detection of the glint pattern from the IR light sources. Therefore, in some embodiments, GDM 620 may implement various techniques to determine which glints correspond to IR light sources (e.g., which glints are controlled) and/or which glints are ambient glints. Further, GDM 620 may filter out ambient glints from image data (e.g., from a frame difference).

For example, GDM 620 may analyze the thresholded frame difference 730 to identify glints D, X, Y, and Z as "glint candidates" (e.g., candidates to be labeled as a controlled glint corresponding to an IR light source). GDM 620 may then apply shape criteria to each of the glint candidates D, X, Y, and Z to determine a subset of glint candidates that meet the shape criteria. For example, the shape criteria may specify a certain expected size and/or shape of a controlled glint (e.g., a round or circular shape having a radius that is expected of a controlled glint), as well as an acceptable deviation from the expected size and/or shape. Other examples of shape criteria are also possible.

Applying illustrative shape criteria to glint candidates D, X, Y, and Z, GDM 620, may eliminate glints X and Z from consideration, as their respective sizes and/or shapes may be sufficiently different from the expected size and/or shape of a controlled glint to conclude that glints X and Z are not controlled glints. Glints D and Y may meet example shape criteria, however, as both may be sufficiently similar to the expected shape and/or size of a controlled glint.

After applying the shape criteria and potentially reducing the number of glint candidates, GDM 620 may implement proximity criteria in an effort to further reduce the number of glint candidates. For example GDM 620 may compare the location of each glint candidate to a hypothesis or a set of hypotheses as to where the appearing controlled glint is expected to be located. (Note that if there are only zero or one glint candidates after applying the shape criteria, the distance-based evaluation may not be performed.)

For instance, GDM 620 may determine the respective distance between the location of each glint candidate D and Y and an expected location 732 of the appearing controlled glint. Then based on the respectively determined distance for each glint candidate, GDM 620 may determine whether or not to set the location of the glint candidate as a location for the appearing glint in the second frame 720.

In some embodiments, the expected location 732 may be the location of a corresponding previous hypothesis for the appearing glint candidate (e.g., the last-determined location of the appearing glint). More specifically, in an illustrative embodiment, a given hypothesis set may include an expected location for each of the glints. Accordingly, a current hypothesis set may include expected glint locations that are determined over a number of frames. As such, the expected location 732 of an appearing glint may be set to or based on the location that was determined the previous time the glint appeared (e.g., four frames earlier. in an embodiment with four light sources).

As a specific example, consider an embodiment where each of four glints is present in three out of every frames (e.g., where there are four light sources and one is switched off during capture of each frame). In this scenario, a computing device may use the last known location of all the glints (e.g., a previous hypothesis set) to predict where each of three expected glints will appear in the next frame. The computing device can then analyze at the next video frame to estimate an eye movement that corresponds to the movement of the glints (as compared to their expected locations from the previous hypothesis set). For instance, an extended Kalman filter could be implemented in conjunction with the regression analysis that is described later herein in order to track the movement of the eye (and thus the movement of glints).

Note that it is possible that multiple glint candidates may be identified for a single appearing glint. For example, depending on the proximity criteria, it may be possible for both glint candidates D and Y to be close enough to meet the proximity criteria. If glint candidates D and Y both meet proximity criteria, then GDM 620 may output a non-ambiguous hypothesis for the location of glint D (e.g., a hypothesis set that includes two or more estimated locations for the appearing glint). In the scenario where the hypothesis for a single appearing glint is ambiguous (e.g., when there are multiple glint candidates), all of the hypotheses for the appearing glint may be discarded by GDM 620. Further, the GDM 620 may continue to rely on a previously determined location for the appearing glint. Alternatively, if there are several valid hypotheses that meet our requirements for, e.g., glint shape, geometric relationships to other glints, and/or consistency with glint locations in past frames, GDM might simply average all the valid hypotheses to determine a single hypothesis for the glint location.

In a further aspect, increasing the number of light sources (and thus the number of corresponding glints) and/or increasing the rate that the light sources are cycled on and off, may help to increase redundancy and thus reduce the number of times that multiple valid glint locations need to be resolved. In addition, if the light sources are cycled at a rate that is greater than the rate that is needed for by an eye-position sensing application, this may allow time that helps to resolve multiple valid hypotheses and/or other errors with eye-position sensing. For instance, if four LEDs are cycled on and off at 30 Hz (and captured by a 120 Hz camera, but a user interface only updates at a refresh rate of 10 Hz, GDM 620 may utilize several clock cycles between user-interface updates to resolve any problem in the hypothesis set of glint locations.

As another example, consider a scenario where eye-position sensing is implemented so as to detect eye gestures, such as rolling of the eyes, looking down or up, etc. In this scenario, it may not be necessary to detect detailed eye movements, such as might be useful for, e.g., moving a cursor on a display. As such, GDM 620 might delay for some period of time (e.g., half of a second) in order to clean up the hypothesis set of glint locations for purposes of gesture recognition. Other examples and variations on these examples are also possible.

In some embodiments, the proximity criteria may be applied to glint candidates via a greedy algorithm. More specifically, the GDM 620 may compute the distance between the location of each glint candidate and the expected location of the appearing glint (e.g., the previously determined glint location for the appearing glint). Note that if there were multiple hypotheses for location of the appearing glint the last time its location was estimated, the distance between each glint candidate in the current frame and each previous hypothesis may be determined, and the shortest distance selected to represent the distance between the glint candidate and the expected location. After determining the distance between each glint candidate and the expected location of the appearing glint, the glint candidate with the shortest distance may be set as the location for the appearing glint. Alternatively, the location or locations of all glint candidates at less than a threshold distance may be kept as part of the hypothesis set for the appearing glint.

ii. Hypothesis Set for a Disappearing Glint

Figure 7D:
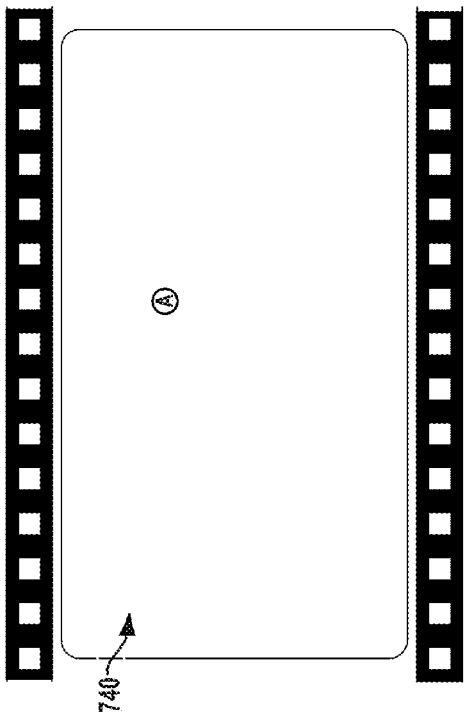

In another aspect, an example method may further involve subtracting a subsequent frame from a previous frame in order to help determine a location of a disappearing glint. For example, FIG. 7D is a simplified illustration of a frame difference 740, according to an illustrative embodiment. In particular, frame difference 740 may be a thresholded frame difference that is determined by subtracting the second frame 720 from the first frame 710, and applying binary thresholding to the resulting frame difference. Thus, as shown, thresholded frame difference 740 includes glint A, which is the disappearing glint between the first frame 710 and the second frame 720.

In some embodiments, the locations for a glint candidate, and the location or location(s) included in a hypothesis set for an appearing or disappearing glint, may take the form of image coordinates. That is, a location may be indicated with particular x and y coordinates in a coordinate system based on the size and shape of the frames of image data in which the glints are detected. For example, a location for a glint may be given by the x and y coordinates of a pixel that is considered to be the center point of the glint. Other examples are also possible.

In an example embodiment, GDM 620 may determine locations (or hypothesis sets of locations) for both the disappearing and appearing glint in each frame of image data. By doing so, and based on the assumption that the IR light sources will turn on and off in a known order, the GDM 620 will know which glint should appear and which glint should disappear in each frame. Accordingly, note that GDM 620 may effectively be solving two independent single-object position sensing problems, rather than one multiple-object position sensing problem.

Note that the examples above describe how the locations (e.g., the image coordinates) of two of the four glints can be determined using two consecutive frames (i.e., the appearing and disappearing glints). However, various aspects described herein may utilize estimated locations of all four glints (i.e., a hypothesis set for the glints). Accordingly, at a given frame, the hypothesis set may include the determined location of the appearing and/or determined location of the disappearing glint, as well as the last-determined locations of any other glints. For instance, consider a scenario where a given light source is turned off every k frames. As such, the location of the corresponding glint may be determined at frame i, then again frame i+k, and so on. As such, it may be assumed that the glint location stays at the location determined at frame i for frame i+1, to frame i+(k−1).

Alternatively, GDM 620 or another component could use an Extended Kalman filter to do prediction/re-estimation of gaze direction. In such an embodiment, GDM 620 may integrate a model of how errors in the glint detection affect the resulting gaze estimation and a model indicating reasonable eye movements (based on e.g., physical limitations of the eye), which may allow GDM 620 to balance an estimated validity of an observed glint location with a prediction of how the eye is moving at the given time.

B. Pupil Detection and Position Sensing

PDM 630 may use various techniques to detect the pupil in image data and/or to determine the location of the pupil center.

In some embodiments, PDM 630 may use a technique such as is described in R. Valenti, and T. Gevers, *Accurate Eye Center Location and Tracking Using Isophote Curvature* (CVPR 2008). Valenti describes a technique to analyze images of the eye and detect the dark circle of the pupil based on properties of the isophote curvature. According to this technique, a curvature of each image point is computed. A radius may then be estimated for a hypothesized dark circle on which the image point lies. Votes are then collected for a number of such dark circles hypotheses, and the center(s) of the circle hypothesis or hypotheses with the highest confidence score(s) may be considered as potential pupil centers.

In practice, the inventors have observed that Valenti may not function as expected when applied to digital images of the eye. For example, there may be some implementations where an alias-sensitivity issue exists. Additionally or alternatively, there may be some implementations where an inaccurate-curvedness issue exists.

Regarding the alias-sensitivity issue, the isophote curvature technique of Valenti may involve estimating the first and second order gradients of images. The estimation of the pupil center and size may be sensitive to the estimation of the gradients. Implementations of gradient estimation for digital images may be computed by convolution with a kernel, such as a Sobel kernel, which is not highly accurate, and thus may be sensitive to an alias effect.

Regarding the inaccurate-curvedness issue, Valenti describes a technique in which a curvedness value is calculated for each pixel in an image. The curvedness value is used for purposes of weighing votes in a voting process. However, because a digital image is a discrete signal rather than a continuous signal, the curvedness values are aligned with pixel boundaries, rather than to pixel centers, and may also have artifacts. As a result, the raw curvedness values may be significantly less useful for weighing votes. Accordingly, in some embodiments, PDM 630 may instead calculate the gray level for each pixel, and then use the gray level to weigh the votes.

More specifically, in some embodiments, pupil detection may involve a "balloon-blowing" technique, which grows a dark circle region from an initial point until the region hit some brighter boundary (e.g., at the edge of the pupil). To implement a balloon-blowing technique, PDM 630 may use a grayscale image of an eye as input. The PDM 630 may also determine an initial pupil-center estimate (e.g., image coordinates of a certain pixel or pixels) inside the dark pupil region of the image. The PDM may then define a small ellipse centered on the initial pupil-center estimate, and iteratively increase the size of the ellipse until the ellipse reaches the dark pupil boundary (e.g., at or near where the edge of the pupil where the iris is visible).

At each iteration in the process, PDM 630 may calculate a gray level in the image at two or more locations that correspond to the edge of the ellipse, and compare the gray levels to determine a difference between the gray levels. For example, PDM 630 may uniformly sample and compare the gray-level difference for a number of sample-point pairs, with each pair including a sample point just inside the ellipse boundary and a corresponding sample point on or just outside the ellipse boundary. PDM 630 may then adjust the size, aspect ratio, and/or rotation angle of the ellipse based on gray-level differences at the boundary of the ellipse, and repeat such adjustments iteratively until this gray-level differences are indicative of the ellipse reaching the dark pupil boundary in the image, e.g., when the inner point in the all or the majority of sample-point pairs is significantly darker than outside point (meaning the gray-scale difference is greater than a threshold difference in at least a threshold number or percentage of sample-point pairs). The center of the ellipse may then be set as the pupil center.

Note that when deciding if and/or how to adjust the ellipse, PDM 630 may compare the gray-level differences at opposite sides of the ellipse. If at least a threshold number or percentage of sample-point pairs on one side have gray-level differences above a threshold number or percentage, while those on the other side do not, this may indicate a misalignment of the ellipse (e.g., due to an inaccurate estimate of the pupil center). Accordingly, PDM may update the estimate of the pupil center, and adjust the alignment, size, and/or shape of the ellipse based on the updated estimate of the pupil center.

As a specific example, at each iteration of the balloon-blowing technique, PDM 630 may determine how many "outliers" exist (e.g., sample pairs for which the point inside the final ellipse has higher gray level and/or is brighter than the point outside the ellipse). Since an outlier may be the result of a poor fitting, the percentage of outliers in all sample points may be used as confidence score, which may be, e.g., a value between 0 and 1, with a score of 1 indicating the highest confidence in the fit to the pupil. Accordingly, the process may be repeated until the confidence score is above a predetermined threshold value.

In some embodiments, PDM 630 may first use a technique such as Valenti's isophote-curvature analysis to determine an initial estimate of the pupil center, and then apply the balloon blowing technique to help provide a more accurate estimation of the pupil center. However, it should be understood that other techniques for determining the pupil center are also possible.

In some embodiments, the isophote-curvature analysis may be used for an initial estimate of the pupil center in a first frame of image data. Subsequent frames may then use the pupil center from the previous frame as an initial estimate of the pupil center, and then apply the balloon-blowing technique described above.

For instance, to determine the pupil center at a given frame i, given a pupil center determined at a frame i−1 (e.g., the previous frame), PDM 630 may first apply the balloon blowing algorithm with the pupil center determined at frame i−1 as the initial estimate for frame i. If a confident result is obtained, then PDM 630 may compute an affinity score based on a comparison between the new pupil hypothesis and the previous one. If the affinity score is high enough, then this is considered to be a match.

As a specific example, PDM 630 may initially determine a fitting having a confidence score above a predetermined threshold, as described above, PDM 630 may then evaluate the shape affinity by e.g., comparing the size of the ellipse in the current frame i to the size of the ellipse in the previous frame i−1. An affinity score may then be determined, which is indicative of shape and/or distance affinity (e.g., how similar the shape and/or location of the ellipse in frame i is to the ellipse determined in frame i−1). In an example embodiment, a higher shape affinity score may indicate a closer match between the ellipse shapes in two frames. As such, a matching pupil shape may be considered to have been determined when the shape affinity score is above a predetermined threshold.

Other factors may also be considered when determining whether the ellipse has been correctly fitted to the pupil in a given frame. For instance, the shape of the ellipse may be compared to previous testing for the given camera (e.g., at the same focal length, eye frame, etc.) or compared to a recent history of pupil sizes, such as in the example provided above. In some embodiments, PDM 630 may consider whether the pupil center seems appropriate given the location of the pupil center in a previous frame or frames (a Kalman filter may be applied to aid in this analysis). Additionally or alternatively, PDM 630 may evaluate the eccentricity of the ellipse as compared to the eccentricity that was determined in a previous frame or frames. Further, various combinations of some or all of the above factors may be weighted in order to determine whether an ellipse has been fitted accurately enough in a given frame.

Note that in some embodiments, if there a confident estimate of the pupil center has not been determined in a previous frame i−1, or the above process to determine the pupil center in frame i fails for some other reason, then PDM 630 may start from pupil center detection to obtain a number of pupil-center candidates. Specifically, an isophote curvature algorithm may be implemented to determine a number of pupil-center candidates. Alternatively, PDM 630 may simply utilize the last location of the pupil center that was determined to be sufficiently accurate.

Other techniques for determining pupil-center candidates are also possible, such as setting the pupil center to be the darkest pixel in the image frame, assuming the image is centered on the eye (or actively centering the image on the eye) and setting the center of the image as the pupil center, or making an even grid of pupil center candidates across an image of the eye. In any such case, PDM 630 may then apply the balloon-blowing technique a number of times, starting from each of the pupil-center candidates, and select the pupil-center candidate with highest balloon-blowing score as the pupil center at the current frame. Alternatively, some or all of such techniques could be used to obtain multiple pupil-center candidates, and PDM 630 could then select the candidate that best matches the size, shape, and location for an average pupil (e.g., based on a model of the eye).

C. Feature Normalization

In embodiments, one or more of the systems described herein may be used to detect and track glints and/or pupil locations. The accuracy at which the pupil locations in an image is mapped to a gaze location on a display may be based at least in part on the location of the system and/or device used in the system relative to the user's eye. For example, when a device remains in the same location relative to the user's eye, the mapping of the pupil location to the gaze location on a display may be invariant. However, when the device drifts or otherwise changes location in relation the user's eye, the mapping of the pupil location to the gaze location on the display may vary. In embodiments, tolerance to the device drift may be obtained by normalizing the pupil locations with glint locations. The normalization method may be based on the number of glints from the detection and eye-position sensing systems.

In embodiments where a single glint is received from the detection and eye-position sensing systems, the single glint may be normalized using a translation normalization. The feature normalization module 640, for example, may perform the translation normalization by computing a relative vector from the pupil location to the glint location. This normalization method may provide invariance to the pupil translation in image space.

D. Calibration

Calibration module 650 may identify glints reflected from an eye. A glint may include a reflection of an infrared light on a corneal surface of a user's eye. The infrared light may be presented to the user in a clockwise or counterclockwise manner. The glints may be identified using any number of devices, such as the wearable computing system. As described herein, the number of glints may range up to four glints; however, additional embodiments may include more than four glints.

Calibration module 650 may determine normalized pupil location based on locations of the glints. The normalized pupil location may be determined by a device, such as the wearable computing system. As discussed in more detail herein, the normalization process may include receiving the identified glints, which may be positioned to form a square. The type of normalization performed on the glints may vary based on the number of glints that are received. Thus, for example, when a single glint is identified and received, calibration module 650 may determine a relative vector from a pupil location to the location of one of the glints using translation normalization. When two glints are identified and received, a coordinate framework with the two glints may be identified, and a pupil location on the coordinate framework may be determined using a similarity normalization of the two glints. Similarly, when three glints are identified and received, a coordinate framework with the three glints may be identified, and a pupil location on the coordinate framework may be determined using an affinity normalization of the three glints. Likewise, when four glints are identified and received, a coordinate framework with the four glints may be identified, and a pupil location on the coordinate framework may be determined using an homography normalization of the four glints.

Calibration module 650 may receive calibrated data associated with an expected pupil location. Calibrated data may generally include data that is used for purposes of calibration. An example of calibrated data may include expected pupil location data, which may represent a location on a Cartesian plane that may be shown to a user. The user may be asked to fixate or otherwise focus on the expected pupil location, and information associated with the user's gaze may be used by the device to identify glints reflected from the user's eye. In yet further embodiments, the expected pupil location may be a default or previously calculated location.

In embodiments, the normalization and calibration processes of calibration module 650 may provide some tolerance to the wearable computing system or other device relative to the eye. For example, the gaze tracker may be robust enough to provide consistent calibrations when the device moves away from or closer to the eye along a visual axis, when the device rotates along a visual axis, when the device moves along a circular orbit trajectory centered by the fovea, etc. In those embodiments where the gaze tracker lacks adequate robustness, such as when the IR camera is moved freely, shifted vertically along a nose bridge, etc., an additional calibration process may be used to learn a camera drift. In some examples, the camera drift may be approximated by a linear offset at the gaze space. Thus, for example, the offset at the gaze space may be for coefficient a0 in the above determined polynomial regression. The process of identifying the offset may be performed using one or more of the calibration points.

E. Gaze Estimation and Eye-Position Sensing

A gaze may be estimated using the regressors from the calibration process. In particular, gaze estimation may be determined by combining one or more of the multiple regressors and/or estimations of the multiple regressors. The method of combining the multiple regressors may vary in embodiments and include, for example, a majority voting style method of combining the multiple regressors.

As an example, if k glints are tracked in a first frame, then all of the valid gaze regressors that use a subset of the k detected glints for pupil location normalization may be used to estimate the gaze. Thus, if glints 0 and 1 are tracked, then the one glint regressors using glint 0 and glint 1, respectively, as well as the two glint regressors using glint 0 and glint 1 may be used to estimate the gaze. In embodiments, the median x and/or y coordinates of the active regressors' estimation results may be taken as the gaze location of the frame. In further embodiments, a median filtering may be applied on a temporal dimension such that the median x and/or y coordinates of the gaze locations in the past n frames may be taken as the current gaze location.

Subsequent to the calibration and/or gaze estimation process, the user may be presented with a validation animation to allow the user to verify the gaze estimation. In some examples, the validation animation may include a grid as a background and a visual representation of the estimated gaze location (e.g., via a dot on the grid). In this manner, the user may view the estimated gaze location. In embodiments, the user may confirm or deny the estimated gaze location based on the validation animation.

While a number of possible gaze estimation techniques have been described herein, it should be understood that described techniques are non-limiting. Moreover, all of the techniques need not be applied to determine an estimated gaze location. For example, in some embodiments, the gaze estimation may be determined without the calibration process. Moreover, in yet further embodiments, the gaze estimation may be determined using a different method of combining the multiple regressors, for example.

Other techniques to implement an eye-position sensing system are contemplated as well. These techniques may include alternative optical-based methods, such as bright pupil and dark pupil. These techniques may also include other types of eye-position sensing systems. For example, an eye-attached tracking system may be implemented. Or, as another example, an eye-position sensing system based on electric potential measurement in which changed in electric field around the eye are detected may be implemented. Other examples are possible as well.

V. Illustrative Functionality

Figure 3:
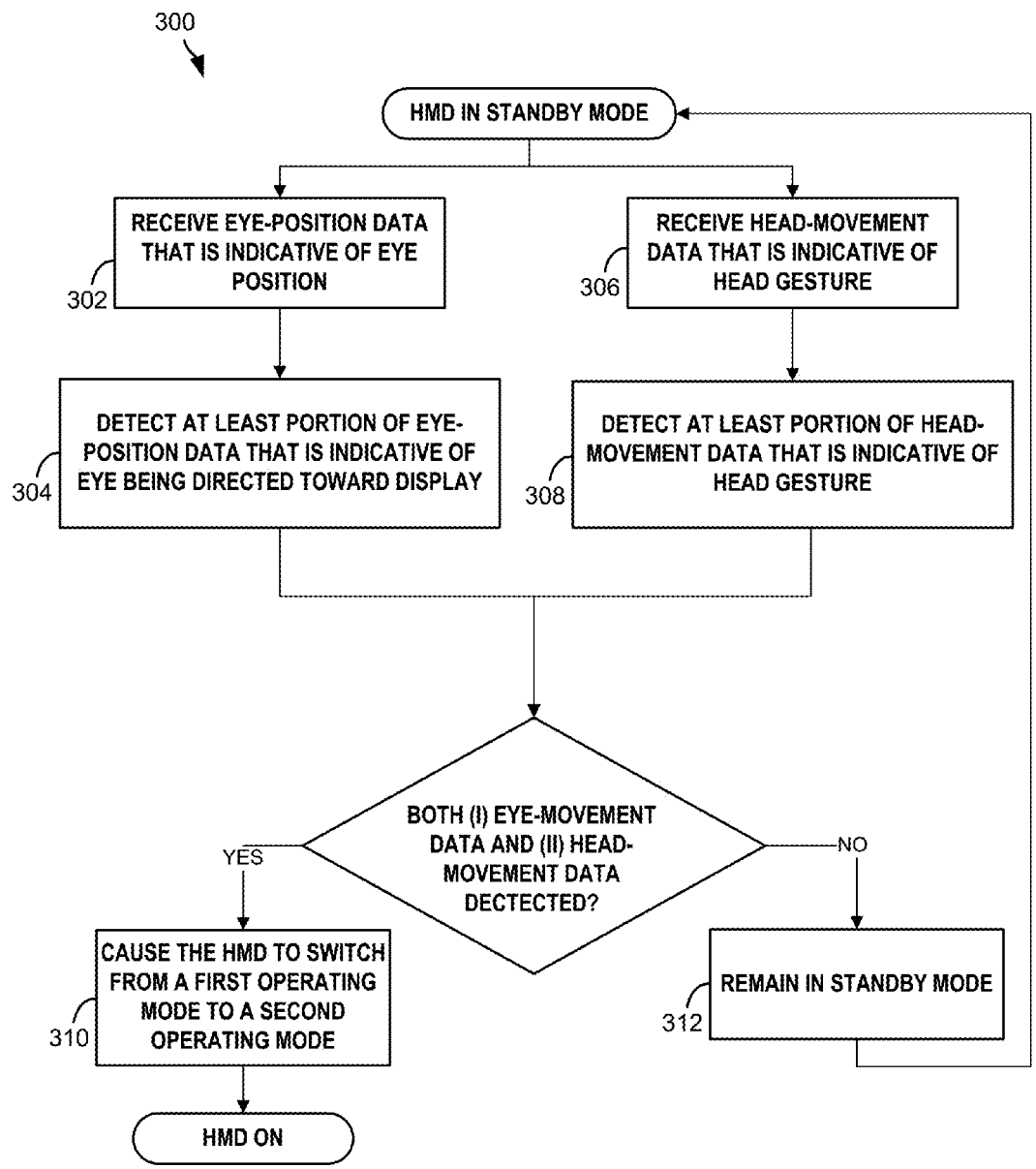
FIG. 3 is a flow chart illustrating a method according to an example embodiment.

FIG. 3 is a flow chart illustrating a method 300, according to an example embodiment. In particular, method 300 may help an HMD to wake up or otherwise switch operating modes in response to performance of a wake-up action that involves both moving one's head and looking at the HMD's display. Note, of course, that method 300 and other example methods may be carried out by other types of computing devices, in addition or in the alternative to an HMD, without departing from the scope of the invention.

Method 300 may be implemented by an HMD that is operating in a first operating mode, and may cause the HMD to switch from the first operating mode to a second operating mode. While the operating modes may be referred to as a first operating mode and a second operating mode, method 300 may be used to switch between any two operating modes of an HMD. For example, method 300 may be implemented by an HMD that is operating in a standby mode, in which some or all of the HMD's capabilities are restricted. While in the standby mode, an HMD may receive eye-position data that is generated by at least one first sensor and indicative of the wearer's eye position, as shown by block 302. As such, the HMD may detect at least a portion of the eye-position data that is indicative of an eye being directed towards a HMD, as shown by block 304. Further, while in the standby mode, the HMD may also receive head-movement data that is generated by at least one second sensor and indicative of head movement, as shown by block 306. As such, the HMD may detect at least a portion of the head-movement data that is indicative of a head gesture, as shown by block 308.

Then, if both (a) the eye-movement data that is indicative of an eye being directed towards the HMD and (b) the head-movement data indicative of the head gesture are detected, the HMD may responsively wake, as shown by block 310. Otherwise, the HMD remains in standby mode, as shown by block 312.

In some embodiments, after waking, the HMD may enter the standby mode in response to no longer detecting data that is indicative of the eye being directed towards the display of the HMD.

Further, in some embodiments, the head gesture may include a head gesture towards the display. For example, if the display is above the eye, such that the user looks upward to see the display, then the head gesture is an upwards head-tilt. Or, if the display is to the right of the eye, such that the user looks to the right to see the display, then the head gesture is a rightwards head-turn.

In other embodiments, the HMD may enter a software mode in response to the detection of a head gesture away from the display. For example, if the display is above the eye, such that the user looks upward to see the display, then the head gesture away from the display may be, among other alternatives, a downwards head-tilt, a head-turn to the right, or a head-turn to the left. Or, if the display is to the right of the eye, such that the user looks to the right to see the display, then the head gesture away from the display may be, among other alternatives, a upwards head-tilt, a downwards head-tilt, or a head-turn to the left.

Further, note that the first sensor that generates eye-position data may vary, depending upon the particular implementation. In an example embodiment, the first sensor may include at least one camera directed toward the eye through a display light guide. In such embodiments, the eye-position data that is received from the first sensor comprises one or more images of the eye captured by the camera. The HMD may detect at least a portion of the head-movement data that is indicative of a head gesture by analyzing the one or more images of the eye to determine whether a pupil is directed at the HMD.

In other embodiments, the first sensor may include a camera directed towards the eye and one or more light sources that are directed towards the eye and configured to cause one or more eye glints. In such embodiments, the eye-position data that is received from the first sensor includes one or more images of the eye captured by the camera. The HMD may detect at least a portion of the head-movement data that is indicative of a head gesture by analyzing the one or more images of the eye glints to determine whether the eye-glints indicate that a pupil is directed at the HMD.

In some embodiments, the second sensor may include at least one accelerometer, at least one gyroscope, and at least one magnetometer. In such embodiments, receiving head-movement data that is generated by at least one second sensor includes receiving one or more data points indicating a resting position; and receiving one or more data points indicating a head movement. The HMD may then detect at least a portion of the head-movement data that is indicative of a head gesture by comparing the one or more data points indicating the resting orientation to the one or more data points indicating a head movement to determine whether the head movement is a head gesture.

In further embodiments, the portion of the head-movement data that is indicative of a head gesture may include data indicating that the head gesture lasts for at least a predetermined period of time. And, in yet other embodiments, the portion of the head-movement data that is indicative of a head gesture includes data indicating an upward head-tilt within the range of five degrees to ten degrees from a resting position.

In some embodiments, the HMD may receive supplemental data that is generated by at least one third sensor, wherein the supplemental data is indicative of a supplemental gesture. The HMD may further detect at least a portion of the supplemental data that is indicative of a supplemental gesture. The HMD may wake in response to the detection of a combination of: (i) the data indicative of an eye directed towards a display of the HMD; (ii) the data indicative of the upwards head-tilt gesture; and (iii) the portion of the supplemental data that is indicative of a supplemental gesture. In some embodiments, the third sensor includes a touchpad that is associated with the HMD.

A. Receiving Eye-Position Data

As noted, block 302 of method 300 involves the HMD receiving eye-position data that is generated by at least one first sensor, wherein the eye-position data is indicative of eye position, as shown by block 302.

Various types of data may be used as eye-position data, from which eye position can be determined. For example, the eye-position data may be one or more images of the eye. Such images may depict at least the pupil of the eye is directed so that where the eye is directed can be determined from the image.

In one embodiment, the first sensor may include a camera directed towards the eye through at least one display light guide in the display. Such a sensor may be implemented in an optical system such as optical system 500 of FIG. 5 having infrared camera 502. The display light guide is intended to direct at least some light reflected from an eye onto the lens of the camera. For example, referring to FIG. 5, the display light guide may include the proximal beam splitter 516, the proximal beam splitting interface 520, the proximal quarter-wave plate 528, the image former 518, and the concave mirror 530. Because the display light guide may include one or more lens and/or mirrors, the camera need not be necessarily physically directed towards the eye. Rather, light reflected from the eye is directed along the display light guide, and onto the camera lens. When the user is looking at the display, the images captured by the camera may depict at least the pupil so that where the eye is directed can be determined from the image.

In a further embodiment, the first sensor may include a camera directed towards the eye and one or more lights sources directed towards the eye to cause glints off the eye. The camera is intended to capture images of the eye and of the glints. Such images may depict at least the glints so that where the eye is directed can be determined from the image. The eye-position data may include the images that depict at least the pupil of the eye.

Note that while the examples above describe the eye-position data as images of the eye, other types of eye-position data are possible. For example, the eye-position data may be data points generated by a capacitive sensor that is arranged to detect changes in capacitance of the muscles surrounding the eye as the eye moves. Other examples are possible as well.

B. Detecting Eye-Position Data that Indicates an Eye Directed Towards a Display

As noted, block 304 of method 300 involves the HMD detecting at least a portion of the eye-position data that is indicative of an eye being directed towards a display, as shown by block 304.

As described above, in one embodiment, the eye-position data may include images depicting at least the pupil of the eye. The HMD may analyze such images to detect when an eye is being directed towards the display of an HMD. To assist with detection, the HMD may apply one or more edge detection algorithms to the images. In such images, the pupil may appear darker than the surrounding parts of the eye, allowing for detection of the pupil using edge detection. When the pupil is detected within a certain region of the image, the HMD may determine that a pupil is directed towards the display in the image. Conversely, the HMD may also determine that a pupil is directed away from the image if the pupil is not detected within the certain region of the image.

Figure 6:
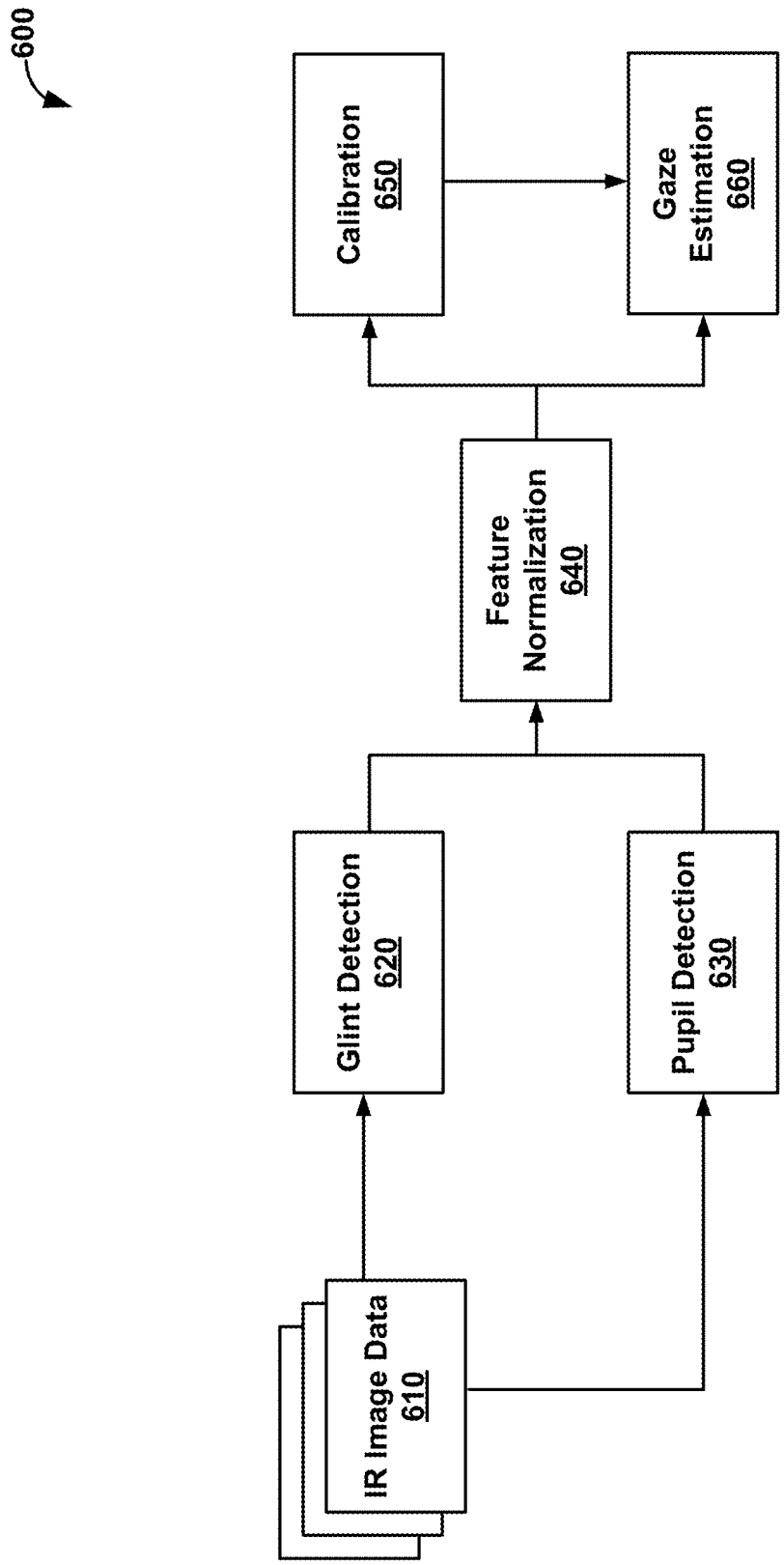
FIG. 6 shows an illustrative eye-position sensing system, according to an example embodiment.

As described above, in a further embodiment, the eye-position data may include images depicting at least the glints caused by reflections off the eye. The HMD may analyze such images to detect when an eye is being directed towards the display of an HMD. A glint-detection and eye-position sensing system, such as the eye-position sensing system 600 of FIG. 6 may be implemented in the HMD to detect when an eye is being directed towards the display of an HMD. When an eye is directed at the display of the HMD, the images depict a pattern of glints that indicates that an eye is directed at the display of the HMD. Similarly, a different pattern of glints, or no glints at all, may indicate that the user is directing the eye away from the display.

C. Receiving Head-Movement Data

As noted, block 306 of method 300 involves the HMD receiving head-movement data that is generated by at least one second sensor, wherein the head-movement data is indicative of head movement, as shown by block 306.

The at least one second sensor may be an inertial measurement unit that includes one or more gyroscopes, one or more accelerometers, and/or one or more magnetometers. In some embodiments, the inertial measurement unit may be integrated into the HMD itself. In further embodiments, the inertial measurement unit may be communicatively coupled with the HMD. Other types of sensors that generate data indicative of head-movement and/or head orientation are possible as well.

Various types of data may be used as head-pose data, from which head pose can be determined. For example, to detect movement and/or determine the pose of an HMD, the HMD may use data from its sensors, such as one or more gyroscopes, one or more accelerometers, and/or one or more magnetometers. Such data may be used to determine the pitch, roll, and/or yaw of the HMD, which numerically indicates the location (e.g., x, y, z coordinates) and/or orientation of the HMD.

D. Detecting Head-Movement Data that is Indicative of a Head Gesture

As noted, block 308 of method 300 involves the HMD detecting at least a portion of the head-movement data that is indicative of a head gesture, as shown by block 308.

In some embodiments, the position of HMD may be considered to be the position of the head. Accordingly, block 308 may involve the HMD determining whether or not the pitch, roll, and/or yaw of the HMD matches a predetermined pitch, roll, and/or yaw that define the predetermined head gesture from the wake-up sequence. Note that such "matching" may involve a determination that the observed values for pitch, roll, and/or yaw are equal to specific predetermined values, or may involve a determination that the observed values for pitch, roll, and/or yaw are within predetermined ranges for pitch, roll, and/or yaw.

In other embodiments, the head gesture may be calculated based on the position of the HMD. In particular, when an HMD is worn, the HMD is offset from the axes around which the wearer's head moves. However, the position of the HMD relative to the axes of head movement may be estimated, or actively determined for the particular wearer. Thus, the HMD can determine the movement and/or position of the wearer's head that corresponds to a known movement and/or position of the HMD. In such an embodiment, block 308 may involve the HMD determining whether or not the pitch, roll, and/or yaw of the wearer's head matches a predetermined pitch, roll, and/or yaw that define the head gesture in the wake-up sequence.

Note that matching the pitch, yaw, and roll may involve a relative aspect, such that the data point comparison may be normalized to the user's last resting position of the head. The resting position may be any head position in which the user keeps their head for a predetermined period of time. For example, a user might rest their head in one position for a few seconds. The HMD may detect this position as a resting position and then determine whether a head gesture has occurred relative to this location. If the user moves their head to another position for a period of time, then the HMD may reset the resting position to that new position.

Figure 4:
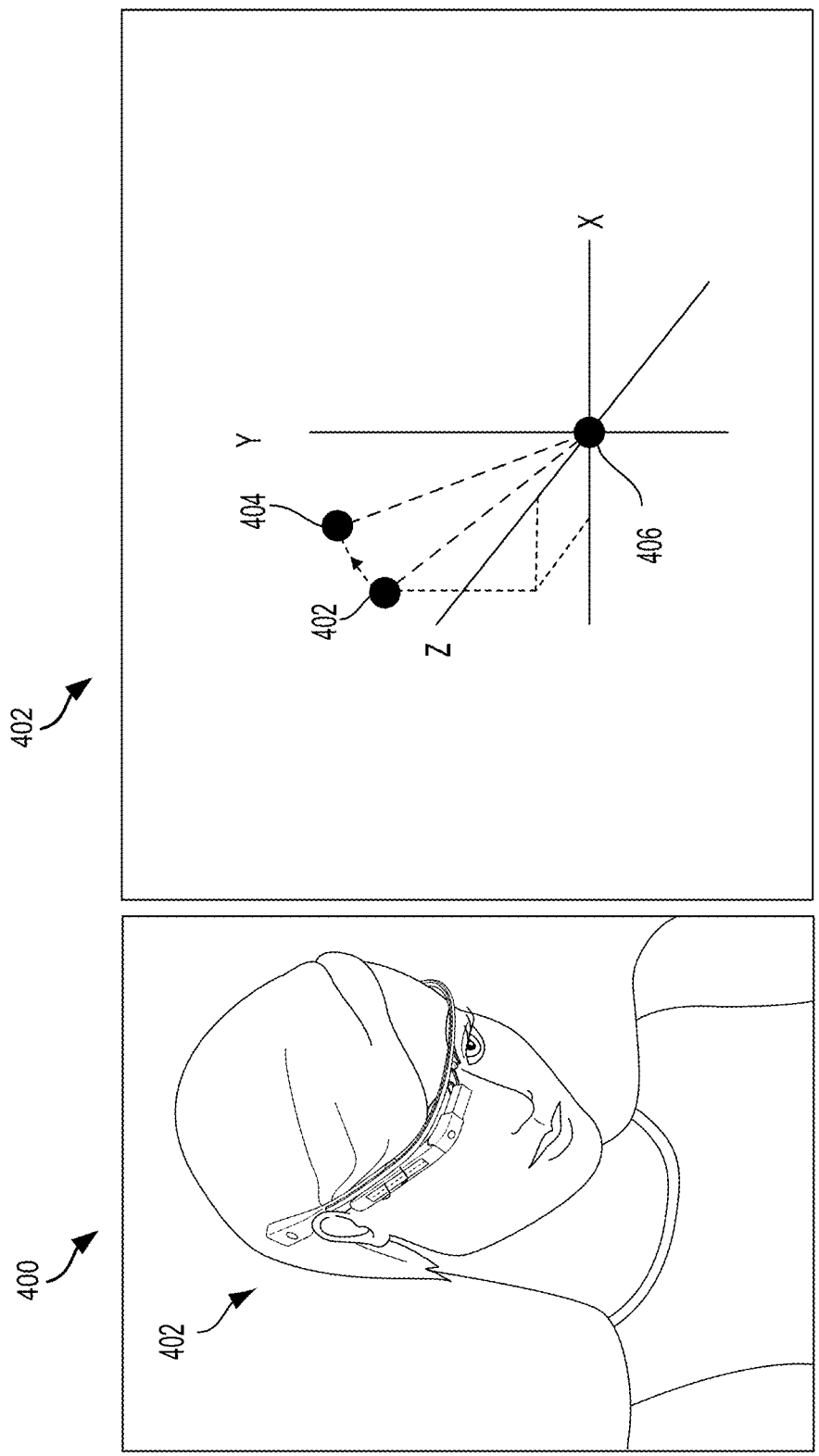
FIG. 4 show an example head position and corresponding coordinate system, according to an example embodiment.

In an example embodiment, the HMD may compare one or more data points indicating a resting position to one or more data points indicating a head-movement to determine whether the head movement is a head tilt gesture. FIG. 4 shows a user 400 wearing an HMD. FIG. 400 also shows a 3-D coordinate system 402 corresponding to the position of the user's head, wherein the origin 406 of the coordinate system corresponds to the base of the user's neck. For example, if the HMD is already in a downwards tilted resting position, as shown by head position 402, then the head gesture may be a head gesture in a direction from that resting position 402, such as a upwards head-tilt gesture to head position 404.

In some embodiments, hysteresis in the time and spatial dimensions may be applied to the resting position and the detection of a head gesture. This filtering assists the HMD in avoiding false positive detections of resting positions and head gestures, respectively. Such filtering may be useful where the user is participating in physical activity, such as running or jogging.

Further, in an example embodiment, an error tolerance or tolerances may be defined for pitch, roll, and yaw, such that the user does not need to replicate the exact head gesture, when performing the head gesture for the unlock sequence. The error tolerance or tolerances may effectively define ranges of pitch, roll, and/or yaw (e.g., within +/−5 degrees from 45 degrees yaw, and so on), which are considered to match the predetermined head gesture.

As noted above, a head gesture may be numerically indicated by the pitch, roll, and/or yaw of the head (or of the HMD). In an embodiment where the head gesture is defined by pitch, roll, and yaw, the head gesture data may be a real-time stream of three-dimensional coordinates; e.g., a stream of (x, y, z) values, in which each set of (x, y, z) coordinates indicates the pose of the head at a particular time. Accordingly, the computing device may determine that the head gesture is correctly performed when the (x, y, z) coordinates remain within acceptable ranges (e.g., within respective error tolerances) for a predetermined period of time, or possibly for at least a threshold percentage of a predetermined period of time. Further, note that in some embodiments, a head gesture may be defined by the combination of the location of the head (e.g., x, y, z coordinates) and the orientation of the head.

Further, as noted above, different head gestures are possible. In some embodiments, the user may configure the user's preferred head gesture. In an example embodiment, the user may configure the gesture by instructing the HMD to record the user's head movement while the user performs the desired head gesture. In other embodiments, the user may select the described head gesture from a list of options. Other examples are possible as well.

In one embodiment, the head gesture may be towards the display. For example, if the display is above the eye, such that the user looks upward to see the display, then the head gesture is an upwards head-tilt. In some embodiments, the upwards head-tilt gesture may be a upwards head tilt within the range of 5-10 degrees from a resting position. Or, if the display is to the right of the eye, such that the user looks to the right to see the display, then the head gesture is a rightwards head-turn.

Further, in some embodiments, the head gesture may include a head-tilt gesture towards the display. The head gesture may be in the direction of the display's position relative to the user's eye. For example, if the display is above the eye, such that the user looks upward to see the display, then the head gesture is an upwards head-tilt.

Note that while the above examples describe the head pose for the wake-up sequence as being defined three-dimensionally (e.g., by pitch, roll, and, yaw), the head pose may also be defined two-dimensionally or one-dimensionally, without departing from the scope of the invention.

E. Causing the HMD to Switch from a First Operating Mode to a Second Operating Mode in Response to the Detection of Both: (i) the Eye-Movement Data that is Indicative of an Eye Directed Towards the Display, and (ii) the Head-Movement Data Indicative of the Head Gesture As noted, block 310 of Figure involves causing the HMD to switch from a first operating mode to a second operating mode in response to the detection of both: (i) the eye-movement data that is indicative of an eye directed towards the display, and (ii) the head-movement data indicative of the head gesture, as shown by block 310. Causing the HMD to switch from a first operating mode to a second operating mode may be referred to a waking the HMD.

Waking the HMD may involve one or more of a variety of actions. In one embodiment, waking the HMD involves enabling one or more components of the HMD, such as the display. In a further embodiment, waking the HMD involves causing one or more components of the HMD to transition from a lower power mode, such as a standby or sleep mode. Other examples are possible as well.

VI. Additional Aspects

In some embodiments, after waking, the HMD may cause itself to enter a standby mode in response to no longer detecting data that is indicative of the eye being directed towards the display. Causing the HMD to enter a standby mode when the eye is no longer directed toward the display may assist in causing the display to be in standby mode when the user is not looking at the display. For example, the user may not be using the display and is therefore directing his eyes away from the display. The HMD may wait until it no longer detects data that is indicative of the eye being directed towards the display for a predetermined period of time. This may allow the user to look away from the display briefly without the display entering a standby mode. In one embodiment, the standby mode involves disabling one or more components of the HMD, such as the display. In a further embodiment, the standby mode involves causing one or more components of the HMD to transition to a lower power mode, such as a standby or sleep mode. Other examples are possible as well.

In further embodiments, the HMD may enter a software mode in response to the detection of a head gesture away from the display. For example, if the display is above the eye, such that the user looks upward to see the display, then the head gesture away from the display may be, among other alternatives, a downwards head-tilt, a head-turn to the right, or a head-turn to the left. Or, if the display is to the right of the eye, such that the user looks to the right to see the display, then the head gesture away from the display may be, among other alternatives, a upwards head-tilt, a downwards head-tilt, or a head-turn to the left. One or more additional gestures may be detected by the same sensors and detection systems as the head-tilt gesture.

The software mode may involve one or more of a variety of actions. For example, the HMD could cause the display to show the weather, show directions to a destination, show the current time, or retrieve message.

In yet further embodiments, the HMD may receive data from at least one third sensor that is configured to generate data that is indicative of a supplemental gesture. The HMD may analyze the data from the at least one third sensor to detect data indicative of a supplemental gesture, and responsively wake the HMD in response (i) the data indicative of an eye directed towards the display; (ii) the data indicative of the upwards head-tilt gesture; and (iii) the portion of the supplemental data that is indicative of a supplemental gesture. Requiring an additional condition to unlock the device may help to reduce false positive system wakes. In addition, the additional condition may provide greater security as compared with not requiring the condition to wake the system. Other benefits are possible as well.

Further, the at least one third sensor may include at least one touchpad associated with the HMD. FIG. 8 depicts a user 802 wearing a HMD 804 having a touchpad 806. In an example embodiment, a user may interact with the touchpad 806 by interacting with the touchpad in one or more contact points, such as contact point 808A and contact point 808B. The user may gesture by moving fingers in relation to the touchpad. For example, the user may move from contact point 808A and contact point 808B to contact point 810A and 810B respectively. The HMD may detect such a gesture as a supplemental gesture. Other supplemental gestures are possible as well.

In some embodiments, the HMD may receive head-movement data that is indicative of head-movement after detecting at least a portion of the eye-position data. In such embodiments, the sensor configured to send the head-movement data may be initially disabled and then, after the HMD detects at least a portion of the eye-position data, the sensor configured to send the head-movement data may be enabled.

In further embodiments, the HMD may receive eye-position data that is indicative of eye position after detecting at least a portion of the head-movement data. In such embodiments, the sensor configured to send the eye-position data may be initially disabled and then, after the HMD detects at least a portion of the head-movement data, the sensor configured to send the eye-position data may be enabled.

VII. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Generally, note that in situations where the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

We claim:

1. A computer-implemented method comprising:
  receiving head-movement data that is indicative of head movement;
  detecting at least a portion of the head-movement data that is indicative of a head gesture;
  receiving eye-position data that is indicative of eye position;
  detecting at least a portion of the eye-position data that is indicative of an eye being directed towards a display of a head-mountable device (HMD); and
  causing the HMD to switch from a first operating mode to a second operating mode in response to the detection of both: (i) the eye-position data that is indicative of an eye directed towards the display, and (ii) the head-movement data indicative of the head gesture, wherein the eye-position data is received before the head-movement data, and wherein reception of the head-movement data is disabled until the eye-position data is received.

2. The method of claim 1, wherein the first operating mode comprises a standby mode, further comprising:
  after switching from a first operating mode to a second operating mode, causing the HMD to enter the first operating mode in response to no longer detecting data that is indicative of the eye being directed towards the display.

3. The method of claim 1, wherein the head gesture comprises a head-movement towards the display.

4. The method of claim 1, further comprising:
  causing the HMD to enable a software mode in response to the detection of a head gesture away from the display.

5. The method of claim 1,
  wherein the eye-position data is generated by at least one first sensor;
  wherein the at least one first sensor comprises at least one camera directed towards the eye through at least one display light guide in the display;
  wherein the eye-position data received from the at least one first sensor comprises one or more images of the eye captured by the camera; and
  wherein detecting at least a portion of the head-movement data that is indicative of a head gesture comprises analyzing the one or more images of the eye to determine whether a pupil is directed at the display.

6. The method of claim 1,
  wherein the eye-position data is generated by at least one first sensor;
  wherein the at least one first sensor comprises:
    a camera directed towards the eye; and
    one or more light sources that are directed towards the eye and configured to cause one or more eye glints;
  wherein the eye-position data comprises one or more images of the eye glints captured by the camera; and
  wherein detecting at least a portion of the head-movement data that is indicative of a head gesture comprises analyzing the one or more images of the eye glints to determine whether the eye glints indicate that a pupil is directed at the display.

7. The method of claim 1,
  wherein the head-movement data is generated by at least one second sensor;
  wherein the at least one second sensor comprises at least one accelerometer, at least one gyroscope, and at least one magnetometer;
  wherein receiving head-movement data that is generated by at least one second sensor comprises:
    receiving one or more data points indicating a resting position, and
    receiving one or more data points indicating a head movement; and
  wherein detecting at least a portion of the head-movement data that is indicative of a head gesture comprises comparing the one or more data points indicating the resting position to the one or more data points indicating a head movement to determine whether the head movement is a head gesture.

8. The method of claim 1, wherein the portion of the head-movement data that is indicative of a head gesture comprises data indicating a head gesture lasting for at least a predetermined period of time.

9. The method of claim 1, wherein the portion of the head-movement data that is indicative of a head gesture comprises data indicating an upward head-tilt within the range of five degrees to ten degrees from a resting position.

10. The method of claim 1, further comprising:
  receiving supplemental data that is generated by at least one third sensor, wherein the supplemental data is indicative of a supplemental gesture;
  detecting at least a portion of the supplemental data that is indicative of a supplemental gesture;
  causing the HMD to switch from a first operating mode to a second operating mode in response to the detection of a combination of: (i) the data indicative of an eye directed towards the display; (ii) the data indicative of the head gesture; and (iii) the portion of the supplemental data that is indicative of a supplemental gesture.

11. The method of claim 10, wherein the at least one third sensor comprises at least one touchpad associated with the HMD.

12. A non-transitory computer readable medium having stored therein instructions executable by a computing device to cause the computing device to perform functions comprising:
  receiving head-movement data that is indicative of head movement;
  detecting at least a portion of the head-movement data that is indicative of a head gesture;
  receiving eye-position data that is indicative of eye position;
  detecting at least a portion of the eye-position data that is indicative of an eye being directed towards a display of a head-mountable device (HMD); and
  causing the HMD to switch from a first operating mode to a second operating mode in response to the detection of both: (i) the eye-position data that is indicative of an eye directed towards the display, and (ii) the head-movement data indicative of the head gesture, wherein the eye-position data is received before the head-movement data, and wherein reception of the head-movement data is disabled until the eye-position data is received.

13. The non-transitory computer readable medium of claim 12, wherein the first operating mode comprises a standby mode, and wherein the instructions are further executable to cause the computing device to perform functions comprising:
  after switching from a first operating mode to a second operating mode, causing the HMD to enter the first operating mode in response to no longer detecting data that is indicative of the eye being directed towards the display.

14. The non-transitory computer readable medium of claim 12, wherein the head-tilt gesture comprises a head-movement towards the display.

15. A computing device comprising:
  a display;
  a non-transitory computer readable medium; and
  program instructions stored on the non-transitory computer readable medium and executable by at least one processor to:
    receive head-movement data that is indicative of head movement;
    detect at least a portion of the head-movement data that is indicative of a head gesture;
    receive eye-position data that is indicative of eye position;
    detect at least a portion of the eye-position data that is indicative of an eye being directed towards a display of a head-mountable device (HMD); and
    cause the HMD to switch from a first operating mode to a second operating mode in response to the detection of both: (i) the data indicative of an eye directed towards the display of the HMD, and (ii) the data indicative of the upwards head gesture, wherein the eye-position data is received before the head-movement data, and wherein reception of the head-movement data is disabled until the eye-position data is received.

16. The computing device of claim 15, wherein the first operating mode comprises a standby mode, and wherein the program instructions are further executable by at least one processor to:
  after switching from a first operating mode to a second operating mode, cause the HMD to enter the first operating mode in response to no longer detecting data that is indicative of the eye being directed towards the display.

17. The computing device of claim 15, wherein the portion of the head-movement data that is indicative of a head-tilt gesture comprises data indicating a head-tilt gesture lasting for at least a predetermined period of time.

18. The computing device of claim 15, wherein the portion of the head-movement data that is indicative of a head gesture comprises data indicating an upward head-tilt within the range of five degrees to ten degrees from a resting position.

19. The computing device of claim 15, wherein the program instructions are further executable by at least one processor to:
   receive supplemental data that is generated by at least one third sensor, wherein the supplemental data is indicative of a supplemental gesture;
   detect at least a portion of the supplemental data that is indicative of a supplemental gesture;
   cause the HMD to switch from a first operating mode to a second operating mode in response to the detection of a combination of: (i) the data indicative of an eye directed towards the display; (ii) the data indicative of the head gesture; and (iii) the portion of the supplemental data that is indicative of a supplemental gesture.

20. The computing device of claim 19, wherein the at least one third sensor comprises at least one touchpad associated with the HMD.

\* \* \* \* \*